(12) United States Patent
Metzger et al.

(10) Patent No.: US 12,234,164 B2
(45) Date of Patent: Feb. 25, 2025

(54) ELECTRODIALYSIS DEIONIZATION BATTERY CELLS

(71) Applicant: Robert Bosch GmbH, Stuttgart (DE)

(72) Inventors: Michael Metzger, Sunnyvale, CA (US); Soo Kim, Cambridge, MA (US); Saravanan Kuppan, Sunnyvale, CA (US); Sondra Hellstrom, East Palo Alto, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/110,119

(22) Filed: Feb. 15, 2023

(65) Prior Publication Data

US 2023/0202886 A1 Jun. 29, 2023

Related U.S. Application Data

(62) Division of application No. 16/731,344, filed on Dec. 31, 2019, now Pat. No. 11,597,663.

(51) Int. Cl.
| | | |
|---|---|---|
| *C02F 1/469* | (2023.01) | |
| *C02F 1/461* | (2023.01) | |
| *C02F 103/08* | (2006.01) | |

(52) U.S. Cl.
CPC .. *C02F 1/4691* (2013.01); *C02F 2001/46133* (2013.01); *C02F 2103/08* (2013.01);
(Continued)

(58) Field of Classification Search
None
See application file for complete search history.

(56) References Cited

U.S. PATENT DOCUMENTS

| | | |
|---|---|---|
| 8,524,062 B2 | 9/2013 | Grebenyuk et al. |
| 2011/0042205 A1* | 2/2011 | Kim ............ C02F 1/4691 204/252 |

(Continued)

FOREIGN PATENT DOCUMENTS

WO 2020142711 A1 7/2020

OTHER PUBLICATIONS

Cseri et al., J. Mater. Chem. A, 2018, 6, 24728 (Year: 2018).*
(Continued)

*Primary Examiner* — Wojciech Haske
(74) *Attorney, Agent, or Firm* — Brooks Kushman

(57) ABSTRACT

A deionization battery cell including a first electrode compartment containing a first intercalation host electrode and includes a first water stream compartment in fluid communication with the first electrode compartment. The deionization battery cell further includes a second electrode compartment containing a second intercalation host electrode and a second water stream compartment in fluid communication with the second electrode compartment. The deionization battery cell also includes an ion exchange membrane assembly including a plurality of anion exchange membranes separated from each other, and from one or more cation exchange membranes positioned between the anion exchange membranes, by a plurality of intervening water stream compartments. The first and second water stream compartments are separated from one another by the ion exchange membrane assembly.

20 Claims, 16 Drawing Sheets

(52) U.S. Cl.
CPC .............. *C02F 2201/4611* (2013.01); *C02F 2201/46115* (2013.01); *C02F 2201/46135* (2013.01)

(56) References Cited

U.S. PATENT DOCUMENTS

| | | |
|---|---|---|
| 2014/0255813 A1 | 9/2014 | Kingsbury |
| 2016/0236952 A1 | 8/2016 | Ikeda et al. |
| 2017/0174820 A1* | 6/2017 | Liu .................. C08G 18/7621 |
| 2018/0148355 A1 | 5/2018 | Smith et al. |
| 2020/0024159 A1 | 1/2020 | Parkey et al. |

OTHER PUBLICATIONS

Chen, J. et al., "An improved Hummers method for eco-friendly synthesis of graphene oxide," Carbon, vol. 64, Jul. 27, 2013, pp. 225-229, DOI: 10.1016/j.carbon.2013.07.055.

Cohen-Tanugi, D. et al., "Quantifying the potential of ultrapermeable membranes for water desalination," Energy & Environmental Science, vol. 7, Feb. 4, 2014, pp. 1131-1141, DOI: 10.1039/c3ee43221a.

Cohen-Tanugi, D. et al., "Water Desalination across Nanoporous Graphene," Nano Letters. Nol. 12, Jun. 5, 2012, pp. 3602-3608, DOI: 10.1021/nl3012853.

Hummers Jr, W. S. et al., "Preparation of Graphitic Oxide" Journal of the American Chemical Society, vol. 80, No. 6, Mar. 20, 1958, p. 1339, DOI: 10.1021/ja01539a017.

Kim, S. et al., "Na2FeP2O7 as a Novel Material for Hybrid Capacitive Deionization," Electrochimica Acta, vol. 203, Apr. 12, 2016, pp. 265-271, DOI: 10.1016/j.electacta.2016.04.056.

Kim, T. et al., "Low Energy Desalination Using Battery Electrode Deionization," Environmental Science & Technology Letters, vol. 4, Sep. 21, 2017, pp. 444-449, DOI: 10.1021/acs.estlett.7b00392.

Lee, J. et al., "Hybrid capacitive deionization to enhance the desalination performance of capacitive techniques," Energy & Environmental Science, vol. 11, Aug. 20, 2014, 8 pages, DOI: 10.1039/C4EE02378A.

Lee, J. et al., "Rocking Chair Desalination Battery Based on Prussian Blue Electrodes," ACS Omega, vol. 2, Apr. 26, 2017, pp. 1653-1659, DOI: 10.1021/acsomega.6b00526.

Smith, K. C. et al., "Na-Ion Desalination (NID) Enabled by Na-Blocking Membranes and Symmetric Na-Intercalation: Porous-Electrode Modeling," Journal of The Electrochemical Society, vol. 163, No. 3, Jan. 5, 2016, pp. A530-A539, DOI: 10.1149/2.0761603jes.

Zhou, K.-G. et al., "Electrically controlled water permeation through graphene oxide membranes," Nature, vol. 559, Jul. 12, 2018, pp. 236-240, DOI: 10.1038/s41586-018-0292-y.

* cited by examiner

ELECTRODIALYSIS DEIONIZATION BATTERY CELLS

CROSS-REFERENCE TO RELATED APPLICATIONS

This application is a divisional of U.S. application Ser. No. 16/731,344 filed Dec. 31, 2019, now U.S. Pat. No. 11,597,663 which issued on Mar. 7, 2023, the disclosure of which is incorporated in its entirety by reference herein.

TECHNICAL FIELD

The disclosure is generally directed to deionization battery cells, for instance, deionization battery cells in an electrodialysis configuration.

BACKGROUND

There is an ever-growing need for quality drinking water. Yet, sources of fresh water on land are limited, some are being depleted, and water quality of other sources is being compromised by a number of industrial and agricultural processes as well as expansion of cities. Thus, technologies are being developed to obtain fresh water from an abundant water source—sea and ocean water. But sea or saline water contains high concentrations of dissolved salt which renders the water unsuitable for human consumption, agricultural use, or industrial processes. Thus, the saline water requires further desalination to lower its concentration of dissolved solids before it can be utilized as drinking water.

Efforts to desalinate water date back thousands of years. For example, first recorded attempts include evaporation of salt water conducted by sailors at sea. The first large-scale modern desalination process, a multi-stage flesh distillation was developed during mid-20$^{th}$ century. Since then, a variety of desalination processes has been proposed and tested. Yet, common problems associated with these processes, which prevent a more widespread use of desalination, include high energy demands, environmental concerns, material issues related to corrosion of membranes, etc.

SUMMARY

In at least one embodiment, a deionization battery cell including a first electrode compartment containing a first intercalation host electrode and includes a first water stream compartment in fluid communication with the first electrode compartment is disclosed. The deionization battery cell further includes a second electrode compartment containing a second intercalation host electrode and a second water stream compartment in fluid communication with the second electrode compartment. The deionization battery cell also includes an ion exchange membrane assembly including a plurality of anion exchange membranes separated from each other, and from one or more cation exchange membranes positioned between the anion exchange membranes, by a plurality of intervening water stream compartments. The first and second water stream compartments are separated from one another by the ion exchange membrane assembly.

In another embodiment, a deionization battery cell is disclosed. The cell includes a first electrode compartment containing a first intercalation host electrode and a first water stream compartment in fluid communication with the first electrode compartment. The cell also includes a first water inlet configured to feed a first water stream into the first water stream compartment in a first direction. The cell also includes a second electrode compartment containing a second intercalation host electrode and a second water stream compartment in fluid communication with the second electrode compartment. The cell also includes a second water inlet configured to feed a second water stream into the second water stream compartment in a second direction. The deionization battery cell also includes an ion exchange membrane assembly including a plurality of anion exchange membranes separated from each other, and from one or more cation exchange membranes positioned between the anion exchange membranes, by a plurality of intervening water stream compartments. The first and second water stream compartments are separated from one another by the ion exchange membrane assembly. The deionization battery cell also includes a controller programmed to adjust an amount of an electric current supplied to change a flow of anions and/or cations present in the first and/or second water streams.

According to one or more embodiments, a desalination battery cell is disclosed. The battery cell includes a first intercalation host electrode, a first water stream compartment in fluid communication with the first intercalation host electrode, a second intercalation host electrode, a second water stream compartment in fluid communication with the second intercalation host electrode, and an ion exchange membrane assembly including alternating anion exchange membranes and cation exchange membranes spaced apart from each other by intervening water stream compartments.

DETAILED DESCRIPTION

Figure 1:
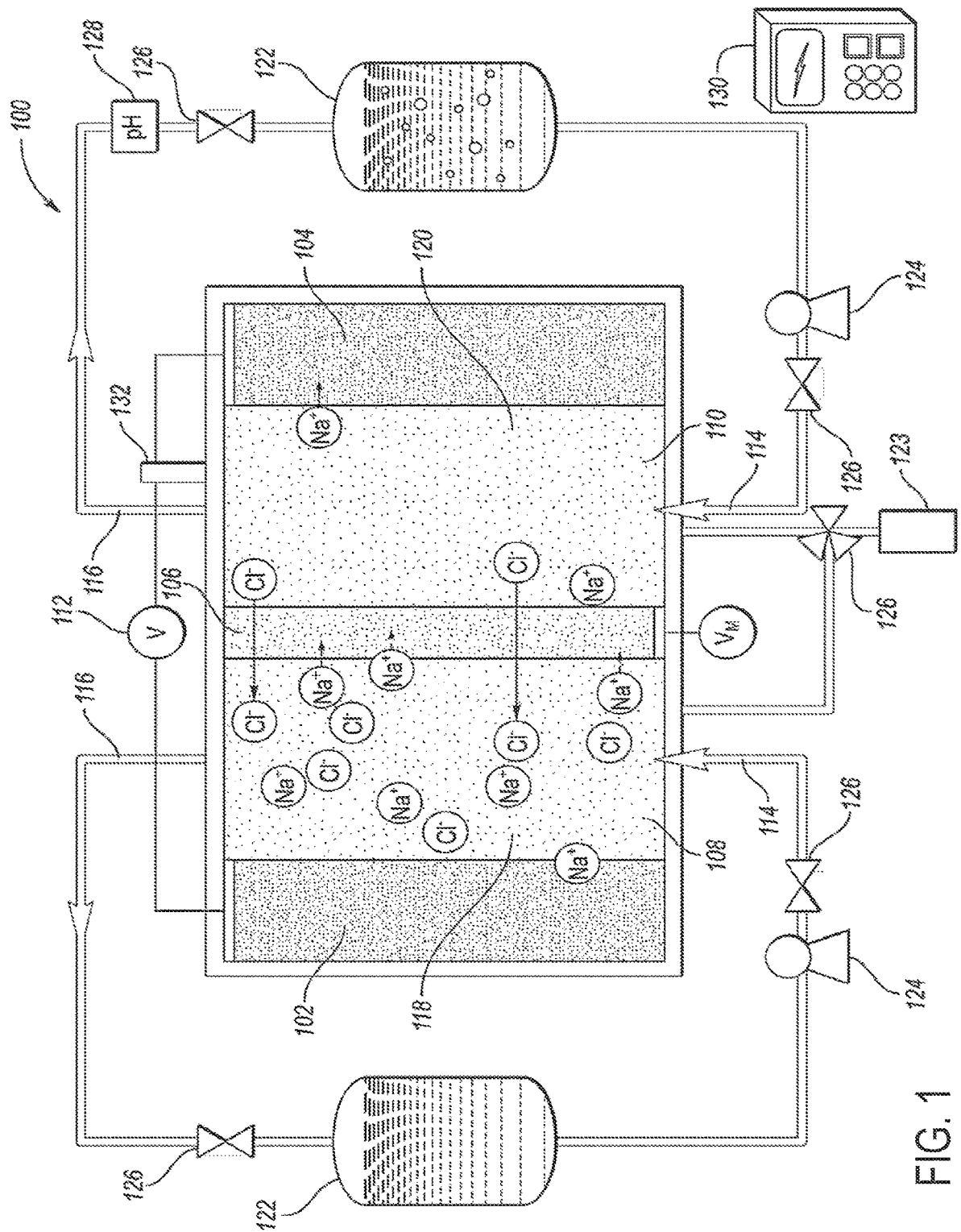
FIG. 1 is a schematic diagram of a non-limiting example of a battery/capacitive deionization cell according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5%, or 10% of the value or relative characteristic.

The Earth's increasing population has an ever-growing need for clean fresh water for consumption, agricultural, and industrial purposes. Fresh water refers to a water solution having a low salt concentration—usually less than 1%. With the fresh water sources being limited, numerous attempts have been made to produce fresh water from abundant sea and ocean waters by desalination. Desalination is a process of removing mineral components from saline water. Removal of salt and other chemicals from the saline water requires electric or thermal energy to separate the saline water into two streams, a fresh water stream containing a low concentration of dissolved salts and a second stream of concentrated brine having a high concentration of dissolved salts.

Various desalination technologies have been developed, for example evaporation, freezing, distillation, reverse osmosis, ion exchange, electrodialysis, and the like. Yet, all of these technologies have certain drawbacks that prevent their wide-spread use and limit their success. For example, reverse osmosis typically requires a large input of electrical energy, which makes this technology quite expensive. Additionally, reverse osmosis utilizes selective membranes which are susceptible to fouling or unwanted accumulation of mineral deposits on the membrane surfaces. The membranes thus need frequent replacement which contributes to maintenance demands and increased cost.

Electrodialysis is another membrane desalination technology implementing ion exchange membranes. Electrodialysis may be costly and does not have a barrier effect against micro bacterial contamination. Yet, membrane-free technologies present other challenges. For example, freeze-thaw typically relies on extended periods of natural sub-zero temperatures and is therefore limited to certain climatic conditions. Multi-effect distillation utilizes several stages or effects during which feed water is heated by steam in tubes onto which saline water is being sprayed. But this technology presents high operating costs unless waste heat is available for the desalination process, and high temperatures may increase corrosion and scale formation.

Among the newly developed concepts are electrochemical approaches to desalination such as a desalination battery or an electrochemical device. Desalination batteries use an electric energy input to extract sodium and chloride ions, as well as other impurity ions from saline water to generate fresh water. The battery thus presents dual-ion electrochemical deionization technology, including sodium and chloride dual-ion electrochemical electrodes to which voltage is applied to bring about separation of saline water into fresh water having a relatively low concentration of dissolved salts and a concentrated brine stream.

It would be desirable to provide a water treatment system utilizing the desalination battery including one or more deionization cells. A non-limiting example of a water treatment system utilizing a desalination battery may include a container to retain a liquid solution such as saline water or desalinated water, two electrodes, a power source, a saline water inlet, and a fresh water outlet. Additional components such as additional inlets, outlets, and the like are contemplated. The two electrodes may be separated by an exchange membrane. The exchange membrane may be either anion or cation exchange membrane. The exchange membrane may include a separator on either or both sides.

The container may be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, desalinated water, contaminated water, industrial water, etc. The container is spacious enough to house a sufficient amount of a water solution undergoing desalination; dimensions thus differ based on a specific application. The container may be large enough to serve industrial applications. The container may be made from different materials capable of withstanding corrosion, temperature fluctuations, changing pH, varying pressure, and be resistant to other chemical, mechanical, and/or physical conditions.

The container may be made from glass, plastic, composite, metal, ceramic, or a combination of materials. The container may feature one or more protective coatings. The container may be made from a material which minimizes occurrence of water contamination. The container may be made from material(s) which are nontoxic and comply with drinking water standards.

The electrodes are arranged within the battery to be in fluid communication with the water present in the container. The electrodes are at least partially submerged in the water solution. The electrodes may be fully submerged in the water solution. The electrodes may be placed on the opposite sides of a container, placed centrally in the container, or both be located on the same side of the container. The electrodes may be located next to each other or be separated by a distance with the presence of separator(s) and exchange membrane (either anion exchange membrane or cation exchange membrane). The distance may be 1 mm or more, 1 cm or more, 10 cm or more, 20 cm or more, 30 cm or more, depending on the dimensions of the battery module and stack systems, container, and electrodes.

The electrodes of the battery function as intercalation hosts. Intercalation refers to reversible inclusion of one or more ions into materials with layered structures. The spaces between layers may serve as a temporary storage for one or more types of ions. The first and second intercalation hosts reversibly store and release cations and anions from the saline water solution having a first concentration $c_1$ of dissolved salts to generate a fresh or desalinated water solution having a second concentration $c_2$ of dissolved salts and a brine solution having a third concentration $c_3$ of dissolved salts within the container. In accordance with this example, $c_3 > c_1 > c_2$ and $c_1$ may be between about 500 to 10,000, 800 to 7,000, or 1,000 to 5,000 ppm of dissolved salts, depending on the saline water source. The battery may reduce the amount of dissolved salts to $c_2$ of about 15 to 250, 30 to 150, or 50 to 100 ppm.

The electrodes may be made from the same or different material, depending on the operating condition and device design. The first, the second, or both electrodes may be made from expanded graphite. Graphite is a crystalline allotrope of carbon and is an example of a semimetal. Graphite presents the most stable form of carbon under standard conditions. Graphite is an electric conductor with highly anisotropic acoustic and thermal properties and is self-lubricating. Graphite has a layered, planar structure. Graphite's individual layers are called graphene. In each layer, the carbon atoms are configured in a honeycomb lattice with natural separation of 0.142 nm. The interlayer distance of pristine graphite is 0.335 or 0.34 nm. Individual atoms in the plane are bonded covalently, but bonding between graphene layers is provided via weak van der Waals bonds.

Thanks to its unique properties and structure, graphite has been used as an anode electrode material in Li-ion batteries. Yet, the applications typically involve pristine graphite. It is well-known that pristine graphite with its interlayer distance between the graphene layers in z-direction of 0.34 nm is not suitable for a different type of batteries, namely Na-ion batteries (NIB) because pristine graphite has a low capacity for Na$^+$ ions. Due to the relatively large size of Na$^+$ ions and steric effects, Na$^+$ generally has a weaker chemical bonding to pristine graphite than other elements present in the same column of the periodic table, that is other alkali metals. For example, Na$^+$ ions have larger radius than Li$^+$, which may hinder mass transport of Na$^+$ ions during electrochemical processes.

Thus, the electrode may include expanded graphite having an interlayer distance sufficient to accommodate Na$^+$ ions. The expanded graphite may be formed by modifying and/or expanding the interlayer distance of the pristine graphene layers. Different methods of expansion may result in an interlayer distance tailored for a specific application. When the graphene layers are expanded such that the expanded graphite interlayer distance is greater than 0.34 nm, specifically to 0.43 nm or more, Na$^+$ ions, and/or other ions, may reversibly insert into and extract from the expanded graphite, delivering a relatively high reversible capacity of >~280 mAh/g at the current density of 10 mA/g. By using expanded graphite instead of pristine graphite, the sodium ion storage capacity may thus improve at least about 20 to 30 times.

The interlayer distance of the graphene layers may be tailored to provide sufficient storage capacity for a variety of anions, cations, or both. The interlayer spacing between the graphene layers may be significantly or substantially uniform. The interlayer spacing may be uniform along the entire length of the graphene layers, if well-controlled by the synthesis conditions.

The interlayer distance $d_s$ between the graphene layers in z-direction in the herein-disclosed expanded graphite may be greater than about 0.34 nm, 0.35 nm, 0.36 nm, 0.37 nm, 0.38 nm, 0.39 nm, 0.40 nm, 0.41 nm, 0.42 nm 0.43 nm, 0.44 nm, 0.45 nm, 0.46 nm, 0.47 nm, 0.48 nm, 0.49 nm, 0.50 nm, 0.51 nm, 0.52 nm, 0.53 nm, 0.54 nm, 0.55 nm, 0.56 nm, 0.57 nm, 0.58 nm, 0.60 nm, 0.61 nm, 0.62 nm, 0.63 nm, 0.64 nm, 0.65 nm, 0.66 nm, 0.67 nm, 0.68 nm, 0.69 nm, 0.70 nm or greater. The interlayer distance $d_s$ of the expanded graphite may be between about 0.37 and 0.45 nm, about 0.45 nm and 0.6 nm. The interlayer distance $d_s$ of the expanded graphite may be from about 0.37 to about 0.7 nm, about 0.43 to about 0.6 nm, or about 0.45 to about 0.55 nm. Different oxygen functional groups in the graphene sheets may assist with controlling the interlayer distance $d_s$. The oxygen functional groups may include groups such as —OH, =O, —O—, —COOH, the like, or a combination thereof. The groups may be prepared via solution-based approach and/or heat-treatment that may precisely control the interlayer distance $d_s$.

As a result of the expanded interlayer distance, expanded graphite can uptake cations and anions from saline water, seawater, brackish water, or the like. Expanded graphite can uptake cations including, but not limited to Na$^+$, Mg$^{2+}$, Al$^{3+}$, Si$^{4+}$, K$^+$, Ca$^+$, Sc$^{3+}$, Ti$^{2+/3+/4+}$, V$^{2+/3+/4+/5+}$, Cr$^{3+/6+}$, Mn$^{2+/3+/4+}$, Fe$^{2+/3+}$, Ni$^{2+/3+/4+}$, Cu$^{2+}$, Zn$^{2+}$, Sn$^{2+/4+}$, Pb$^{4+}$, etc. and anions including, but not limited to, single anion species such as F$^-$, Cl$^-$, Br$^-$, I$^-$, S$^{-/2-}$, anion complexes such as ClO$_4^-$, ClO$_3^-$, ClO$_2^-$, BrO$_4^-$, BrO$_3^-$, SO$_4^{2-}$, SiO$_3^{2-}$, CN$^-$, metal-containing anions such as MX$_y$O$_z^{n-}$ (where M=Na, Mg, Al, Si, K, Ca, Sc, Ti, V, Cr, Mn, Fe, Ni, Cu Zn, Mo, Sn, Cs, and Pb; X=F, Cl, Br, I, N, and P; and $0 < y \le 5$; $0 \le z \le 5$; $1 \le n \le 4$), and the like.

The expanded interlayer distance of the expanded graphite allows even ions with a relatively large radius such as Na$^+$ to be drawn within the spaces defined by the graphene layers, temporarily remain therein, and be released later. The expanded graphite thus hosts one or more ions as guests. For example, the intercalation material may include one or more of the following active materials: A$_x$CuFe(CN)$_6$, where A=Li, Na, K, Cs and $0 \le x \le 1$, A$_x$MnFe(CN)$_6$, where A=Li, Na, K, Cs and $0 \le x \le 1$, A$_x$MnMn(CN)$_6$, where A=Li, Na, K, Cs and $0 \le x \le 1$, A$_x$ZnFe(CN)$_6$, where A=Li, Na, K, Cs and $0 \le x \le 1$, A$_x$BaFe(CN)$_6$, where A=Li, Na, K, Cs and $0 \le x \le 1$, Ti$_x$Fe$_{1-x}$[Fe(CN)$_6$]$_{0.96}$, where $0 \le x \le 1$, Polyimide (PNDIE), FePO$_4$, NaMnFe$_2$(PO$_4$)$_3$ Alluaudite, Na$_3$Fe$_3$(PO$_4$)$_4$,Na(M)PO$_4$, where M=Fe, Mn, or Fe$_x$Mn$_{1-x}$ and $0 \le x \le 1$, MnO$_2$, Na$_x$MnO$_2$, where $0 \le x \le 1$, ZnMn$_2$O$_4$, MgFeSiO$_4$/C, Mg$_x$Mn$_{2-x}$SiO$_4$, where $0 \le x \le 2$, Mg$_{0.5}$Ti$_2$(PO$_4$)$_3$, LiTi$_2$(PO$_4$)$_3$, Ti$_x$Al$_{2-x}$(PO$_4$)$_3$, where $0 \le x \le 2$, TiP$_2$O$_7$, Na$_3$MnTi(PO$_4$)$_3$, K$_2$Ti$_4$O$_9$, TiS$_2$, FeS$_2$, CaMO$_3$, where M=Mn and/or Fe, Potassium Terephthalate, 2,5-pyridinedicarboxylate (K$_2$PC), KFeF$_3$, K$_{0.3}$MnO$_2$, KMg$_x$Fe$_{2-x}$(PO$_4$)$_2$, where $0 \le x \le 2$, A$_x$FeFe(CN)$_6$, where A=Li, Na, K, Cs and $0 \le x \le 1$, A$_x$NiFe(CN)$_6$, where A=Li, Na, K, Cs and $0 \le x \le 1$, NaTi$_2$(PO$_4$)$_3$, Na$_2$FeP$_2$O$_7$, TiO$_2$, Na$_2$Ti$_3$O$_7$.

The cation intercalation active material may be doped or un-doped cubic spinel $MnO_2$, $Na_4Mn_9O_{18}$ (or equivalently, $Na_{0.44}MnO_2$) tunnel structured orthorhombic materials, $NaM_2(PO_4)_3$ (where M=Ti, Mn, Fe, Ni, Cu, or combinations thereof), where the exact composition of Na may be controlled by thoroughly mixing different starting amount of $Na_2CO_3$ or NaOH with metal oxide precursors, followed by the heat treatment at high temperature (about 800° C.). Partial substitution of Na in these structures with Li, Mg, Ca, and/or K is allowed.

Additionally, the cation intercalation material to be used as an electrode may include, but is not limited to, $Na_{0.44}Mn_2O_4$, $NaMnO_2$, $K_{0.27}MnO_2$, $Na_{2/3}Ni_{1/4}Mn_{3/4}O_2$, $\gamma$-$MnO_2$, $Na_3V_2(PO_4)_3$, $Na_2VTi(PO_4)_3$, $NaVPO_4F$, $Na_2V_6O_{10} \cdot xH_2O$, $Na_{0.66}[Mn_{0.66}Ti_{0.34}]O_2$, $MoO_3$, $Na_2FeP_2O_7$, $Na_3TiMn(PO_4)_3$, $Na_3V_2O_2(PO_4)_2F$, the like, or a combination thereof. The cation intercalation host material may include Prussian blue and/or Prussian blue analog-hexacyanoferrate (HCF) or hexacyanomanganate (HCM)-based compounds such as NiHCF, NiCuHCF, and MnHCM.

On the other hand, the intercalation material may be specialized for anions. The anion intercalation active material may include AgCl, $FeCl_3$, $C_3N_4$, FeOCl, BiOCl, VOCl, $Mg(ClO_2)_2 \cdot 6H_2O$, $MgCl_2O$, $NaClO_2 \cdot 3H_2O$, at least one of the following ternary and quaternary metal oxides and metal oxychlorides: $AlH_{12}(ClO_2)_3$, $MnH_8(ClO_2)_2$, $FeH_8(ClO_2)_2$, and $NiH_8(ClO_2)_2$, at least one of the following alkali-metal-based and transition-metal-based oxychlorides and their hydrates: $Ca_4Cl_6O$, CaHClO, $NaH_4ClO_2$, AlClO, $Si_3(Cl_4O)_2$, $SiCl_2O$, $Si_6Cl_{10}O_7$, $SiCl_2O$, $Si_2Cl_2O_3$, $Ti(ClO_4)_4$, TiClO, $Mn_8Cl_3O_{10}$, $MnH_4(ClO)_2$, FeClO, $Ni(ClO_4)_2$, $NiH_{16}(ClO_8)_2$, $NiH_{12}(ClO_3)_2$, $Cu_2Cl_2O$, and $CuH_8(ClO_5)_2$, the like, or a combination thereof.

An example loading amount of the active material capable of intercalation may be about 0.01 to 100 mg/$cm^2$, 0.05 to 50 mg/$cm^2$, or 0.1 to 10 mg/$cm^2$ in the cathode, anode, or both.

Besides the active material, one of the electrodes or both may include one or more conductivity agents, one or more polymeric binders, and/or other components. The electrode(s) may include active material in the amount of about 70 to 99 wt. %, 75 to 97 wt. %, or 60 to 95 wt. %, based on the total weight of the electrode. The electrode(s) may include one or more conductivity agents in the amount of about 1 to 40 wt. %, 2.5 to 30 wt. %, or 5 to 20 wt. %, based on the total weight of the electrode. The electrode(s) may include one or more polymeric binders in the amount of about 1 to 30 wt. %, 2.5 to 20 wt. %, or 5 to 15 wt. %.

A non-limiting example of a conductivity agent may include carbon black, conductive carbon black, amorphous carbon, carbon fibers, quaternary ammonium salt(s), alkyl sulfonate(s), halogen-free cationic compound(s), the like, or a combination thereof.

A non-limiting example of a polymeric binder may be polyvinylidene fluoride (PVdF), polyacrylonitrile (PAN), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (PVdF-CTFE), poly(methyl methacrylate-vinyl acetate) (PMMA-VAc), poly(ethylene glycol) diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG), the like, or a combination thereof.

Additionally, the electrode(s) may include one or more pillaring agents. Pillaring agents or dopants refer to various compounds which may be incorporated within the structure of the electrode by chemical modification of the active material. For example, the pillaring agents may be chemically and/or mechanically bonded to the individual graphene layers of the expanded graphite. The one or more pillaring agents may be incorporated between adjacent graphene layers within the expanded graphite and/or configured to maintain a predetermined, specific interlayer spacing distance $d_s$ between the adjacent layers.

The pillaring agents may further enhance the mass transport and/or selectivity of ion adsorption and desorption processes in the battery. For example, incorporating sulfur as a pillaring agent may result in attracting a larger proportion of cations. Alternatively, modifying the electrode active material with positive metal or metal oxides may result in an increased attraction of anions while repelling cations. The pillaring agents may thus assist with adjusting chemistry of the fresh water solution to achieve a desirable chemical composition of drinking water. For example, in a region where the seawater to be desalinated contains an undesirable amount of anions and/or desirable amount of cations, a positive pillaring agent may be incorporated to attract the anions to be intercalated while leaving a greater amount of cations in the water solution. The fresh water solution may thus be tailored to the local needs and drinking water norms.

The electrodes may operate within the water stability window, about −0.5 to 1.5 V, −0.4 to 1.2 V, −0.3 to 1.1 V, or 0 to 0.9 V in comparison to standard hydrogen electrode (SHE) (or, 2.2 to 3.6 V vs. $Na/Na^+$) to store one or more of the above-mentioned types of ions, for neutral water at pH of about 7-8. Lower pH value can shift the voltage higher (up to +0.4 V at pH=0) and higher pH value can shift the voltage lower (up to −0.4 V at pH=14).

The actual storage capacity of ions in the electrodes may vary depending on the operating voltage conditions, concentration of ions present in the water solution, overall chemical composition of the water solution, acidity of the water solution, and ohmic or any other type of resistance within the battery device, etc. For example, the actual capacity of ions in the electrodes may differ based on location as seawaters in different parts of the world have varying ion concentrations.

The salt adsorption capacity of the electrodes may vary from about 1 to 300, 5 to 150, or 10 to 100 mg salt/g of active electrode materials. The electrode area may vary from about 10 to 500, 50 to 350, or 100 to 250 $cm^2$. The electrode thickness may vary from about 2.5 to 500, 5 to 400, or 10 to 300 m, depending on the choice of electrode materials, porosity, tortuosity, viscosity of slurry containing the electrode materials, and the actual composition ratio of active material(s). binder carbon. The porosity of electrodes may be about 20 to 80, 30 to 70, or 40 to 60%. The electrode density may vary from 0.1 to 5, 0.25 to 4, or 0.5 to 3 g/$cm^3$, depending on the particle size, microstructure, hardness of materials, as well as the amount of additive carbon in the electrode system.

The charge time for the battery for water cleaning may be from about 1 to 60 minutes, 5 to 45 minutes, or 15 to 30 minutes, depending on the capacity. The discharge time for electrode cleaning may take about 50 to 100% of the charge time, that is about 30 seconds to 60 minutes, 2.5 to 45 minutes, or 7.5 to 30 minutes. Typical flow rate during the charge process range may be about 0.5 to 5000 L/minute, 1 to 2500 L/minute, or 5 to 2000 L/minute, depending on a number of cells included in the battery module. The recovery rate of water may be greater than about 50, 55, 60, 65, 70, 75, 80, 85, 90, or 95%. The exact water flow rate may be controlled by the pumps as discussed below.

The electrodes may be separated by an exchange membrane. The exchange membrane may include a separator on either or both sides. The exchange membrane may be a cation or anion exchange membrane.

The exchange membrane may be an anion exchange membrane (AEM). The AEM may include graphene, graphene oxides, or both composed of hydroxyl-rich (—OH) oxygen functional groups. Specific functional groups such as hydroxyl (—OH), carboxylic (—COOH), carbonyl (=O), epoxy (—O), or a combination thereof, in graphene oxides allow adsorption and desorption of cations i.e., $Na^+$, $K^+$, $Mg^{2+}$, $Ca^{2+}$, $Pb^{2+}$, etc.) at a relative stable voltage window such as 1.0 to 1.5 V or 0.401 to +1.23 V vs. SHE. In contrast, the anion absorption voltage is very high due to the electronic repulsion between the anion itself and graphene oxides oxygen functional groups (—OH, —COOH, =O, and —O—). Unless a very large voltage, greater than 3 V, is applied to the system, the anions such as $F^-$, $Cl^-$, $Br^-$, $I^-$, or $S^{2-}$, and anion complexes, including but not limited to, $ClO_4^-$, $ClO_3^-$, $ClO_2^-$, $BrO_4^-$, $BrO_3^-$, $SO_4^{2-}$, $SiO_3^{2-}$, or $CN^-$ freely move to the other side of the membrane because of the repulsion by the negatively-charged oxygen functional groups in the AEM materials. Thus, the functionalized graphene oxide layer may be used as a selective ion exchange membrane that only allows anions to pass.

The AEM may include a mixture of graphene oxides and other electronically conductive polymers including polyethylene oxide (PEO), poly(pyrrole)s (PPY), polyanilines (PANI), poly(thiophene)s (PT), poly(3,4-ethylenedioxythiophene) (PEDOT), poly(p-phenylene sulfide) (PPS), poly (acetylene)s (PAC), and poly(p-phenylene vinylene) (PPV), the like, or a combination thereof. In addition, the AEM may be composed of a mixture of graphene oxides and other polymers that are not electronically conductive but are ionically conductive including cross-linked poly-vinyl alcohol (PVA), cross-linked polymethylmethacrylate (PMMA), polyphenylene vinylene (PPV), the like, or a combination thereof. Additional electronically conductive material can be added as needed, such as graphite, hard carbon, soft carbon, carbon black, the like, or a combination thereof.

The battery or deionization device further contains a power source, current source, or voltage source capable of supplying electric current to the electrodes and/or the exchange membrane. The electric current is being applied to remove various ions from the water contained in the container. Applied voltage V and membrane voltage Vm may be used to control selective ion permeability and influence overall efficiency of the water desalination process. The electric current may be constant current until reaching a predetermined voltage cutoff or positive voltage may be applied to the battery. Cation entrapment and anion diffusivity thought the exchange membrane may be enhanced by applying a controlled membrane voltage Vm. The membrane voltage may be about 0 to ±0.5 V.

A non-limiting example battery cell 100 for use in a water treatment device is depicted in FIG. 1. Battery cell 100 may be referred to as a deionization cell. Battery cell 100 includes two electrodes 102 and 104 and an anion exchange membrane (AEM) 106 placed between the electrodes 102, 104. Exchange membrane 106 separates two independent water compartments 108, 110. Electrodes 102, 104 are connected to a voltage source 112. Battery cell 100 also includes one or more water inlets 114 and water outlets 116.

Water inlets 114 and water outlets 116 may be used to bring in or release saline or desalinated water. The number of inlets 114 and outlets 116 per compartment 108, 110 may be the same or different. For example, a first compartment 108 may have one more inlet than the second compartment 110. One or more inlets 114 may be located between AEM 106 and intercalation host 102, 104. An inlet 114, an outlet 114, or both may be located centrally between AEM 106 and host electrodes 102, 104. An inlet 114 may be located directly across from an outlet 116. Alternatively, an inlet 114 and an outlet 116 of the same compartment 108 or 110 may be staggered such that inlet 114 and outlet 116 are not aligned, are not placed on the same axis, are not located centrally between the AEM 106 and an electrode, or a combination thereof. The at least one inlet 114, outlet 116 or both may have the same or different diameter. The at least one inlet 114, outlet 116, or both may connect battery cell 100 with one or more water reservoirs 122, additional reservoirs, or a combination thereof.

Additionally, battery cell 100 and additional battery/deionization cells disclosed herein may be connected to one or more water reservoirs 122 for storing saline or desalinated water, one or more pumps 124 capable of controlling water flow rate to from the battery 100, valves 126 connected to one or more pumps 124, and/or one or more devices 128 capable of checking, determining, or monitoring water quality such as a pH meter, water softener, etc. Reservoir 122 may be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, contaminated water, industrial water, etc. Pumps 124 may be automatic, manual, or both. Pumps 124 may be located in the inlet, outlet pipes, a stream connected to reservoir 122, or a combination thereof.

Battery cell 100 may include two symmetrical electrodes 102, 104 including the same or similar chemistry and loading of the electrode material. Alternatively, battery 100 may feature an asymmetric electrode configuration such that first electrode 102 is made at least partially or entirely from a different material than second electrode 104, first electrode 102 has a different loading of the same or different material than second electrode 104, or a combination thereof. Electrode materials may share similar structural characteristics such as same space group, but the concentration of ions such as $Na^+$, $Ca^{2+}$, or $Mg^+$ may differ. In a non-limiting example embodiment, one of the electrodes may be made from chemically delithiated intercalation host material, e.g., $Na_xMnO_2$ with $x<x_{max}$, where the starting concentration of alkali metal within the alkali metal oxide is denoted by x. A non-limiting example of asymmetric electrodes may include one electrode including $FeFe(CN)_6$ and the second electrode including $NiFe(CN)_6$.

The pumps 124, valves 126, and/or devices 128 may be operated manually or by a controller 130 programmed or otherwise configured to operate and control them. Additionally, controller 130 may be configured to control the power source, current source, or voltage source capable of supplying electric current to the electrodes and/or the exchange membrane. Depending on the specific configuration of battery cell 100, one or more controllers may be used.

Once activated, battery cell 100 may, for example, be run in the following manner. A positive voltage V may be applied to battery cell 100 to release cations such as $Na^+$ from one of the electrodes 102, 104. The cations are dispersed with the saline water in one of the water compartments 108, 110. A brine compartment 118 including saline water solution having a first concentration $c_1$ of dissolved salts. Saline water in brine compartment 118 may be supplied through one of the water inlets 114. As cations cannot travel through anion exchange membrane 106, the concentration of $Na^+$ in brine compartment 118 increases. Anions such as $Cl^-$ become attracted and travel through anion exchange membrane 106 to neutralize the cations in brine compartment 118. At the same time, cations such as $Na^+$ ion intercalate into the other side of the electrodes 102, 104 due to charge neutrality and the applied voltage bias. This process creates a clean water compartment 120 including a fresh or desalinated water solution having a second concentration $c_2$ of dissolved salts on the opposite side of anion exchange membrane 106 such that $c_1 > c_2$.

Battery 100 may be a closed or open system. Battery 100 may operate in cycles (intercalation and de-intercalation), where the water flows continuously. Under the continuous flow, the desalinated water from clean water compartment 120 may be stored in reservoir 122. Alternatively, battery 100 may operate as a batch desalination device, where a limited amount of water may be supplied to a compartment to be cleaned in a smaller scale operation. Alternatively, or in addition, a semi-continuous flow of water may be supplied to battery cell 100 such that water compartments 108, 100 may be refilled with additional saline water and may operate in the reverse direction in the next cycle. In an alternative embodiment, battery cell 100 may be designed as a cylindrical tubular cell. Both compartments 108, 100 may be used for water purification in reverse operating direction.

In a non-limiting example, a continuous collection of clean water in successive cycles may be provided by utilizing a clean water reservoir 122 and a recycling loop for water purification. During the start-up, two electrodes 102, 104 are at similar state-of-charge (for example 50%), then first electrode 102 is discharged (toward 0%) and second electrode 104 is charged toward 100% SOC. In the first cycle, the first target ions including $Na^+$, $K^+$, $Mg^{2+}$, $Ca^{2+}$, and $Pb^{2+}$, and the like may be removed from electrodes 102, 104 including the intercalation host material. Anions are added to brine compartment 118 due to the cation-anion attraction (neutrality). Clean water compartment 120 thus contains desalinated water that may be collected. The next cycle allows to flush ions out of electrodes 102, 104, expelling waste water. Electrodes 102, 104 may be also available for the next water purification cycle.

The desalinated water may be cycled in battery 100 one or more times to further purify the water to reach a predetermined concentration $c_x$ of dissolves salts such that $c_x > c_2$. Additionally, a post-treatment step may be carried out to further neutralize/adjust the water as required by a specific application.

Figure 2A:
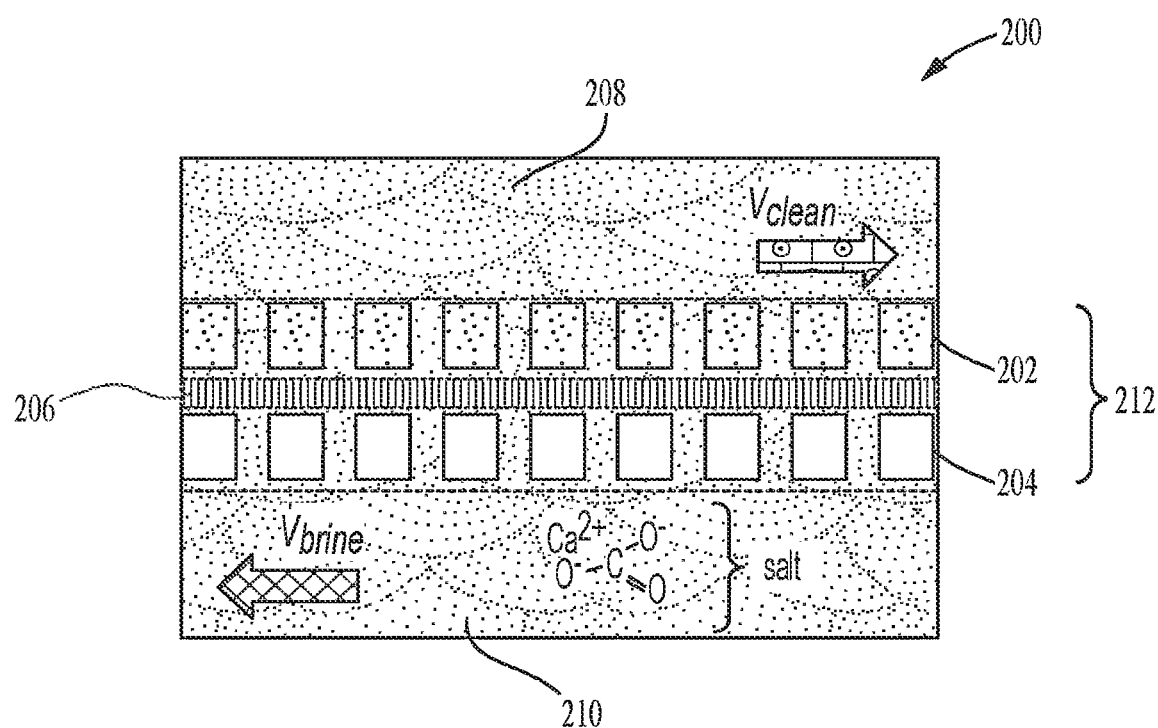
FIGS. 2A and 2B are schematic diagrams of non-limiting examples of battery/deionization cells in accordance with various embodiments.
Figure 2B:
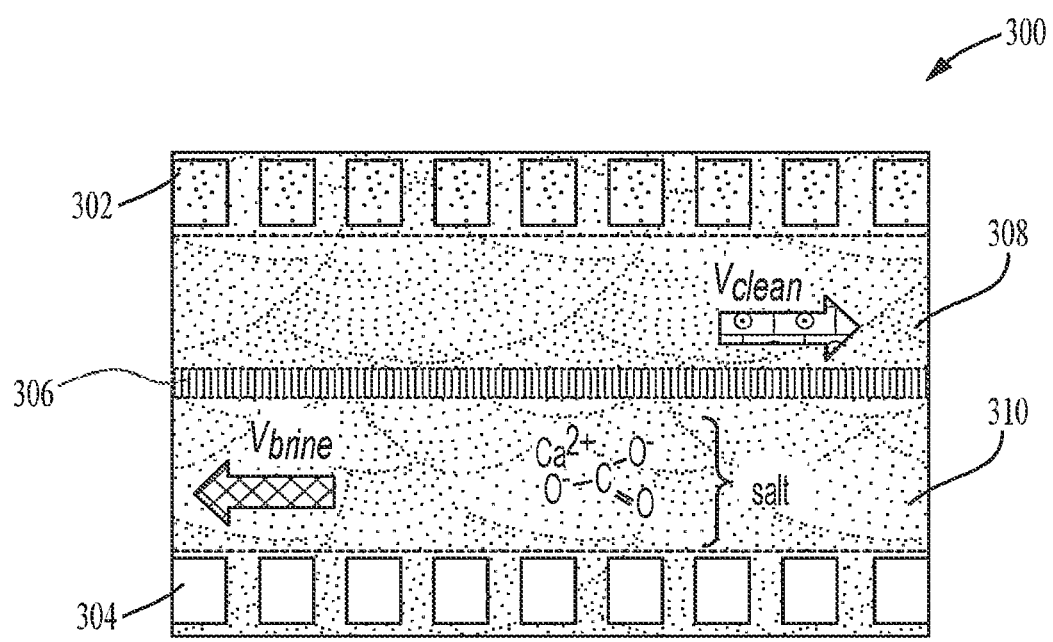

As shown in FIG. 2A, in accordance with at least one embodiment, a battery cell 200 may include intercalation host (IH) electrodes 202, 204 respectively positioned within first and second electrode compartments separated by an anion exchange membrane (AEM) 206. In the configuration depicted in FIG. 2A, the first and second electrode compartments are in fluid communication with first and second water stream compartments 208, 210 positioned on opposite sides of the membrane electrode assembly (MEA) 212, which includes IH electrodes 202, 204 and AEM 206. In accordance with certain other embodiments—an example of which is shown in FIG. 2B—a battery cell 300 may include water stream compartments 308, 310 positioned between an AEM 306 and IH electrodes 302, 304. As depicted in FIG. 2B, IH electrodes 302, 304 are respectively positioned within first and second electrode compartments and separated by both AEM 306 and intervening water stream compartments 308, 310 in fluid communication with the first and second electrode compartments. In some configurations, the first and second electrode compartments may not be physically separated from the first and second water stream compartments. In accordance with such configurations, the IH electrodes may be positioned within the first and second water stream compartments and separated from each other by either only the AEM (as generally shown in FIG. 2A) or by both the AEM and at least a portion of the first and second water stream compartments (as generally shown in FIG. 2B).

Figure 2C:
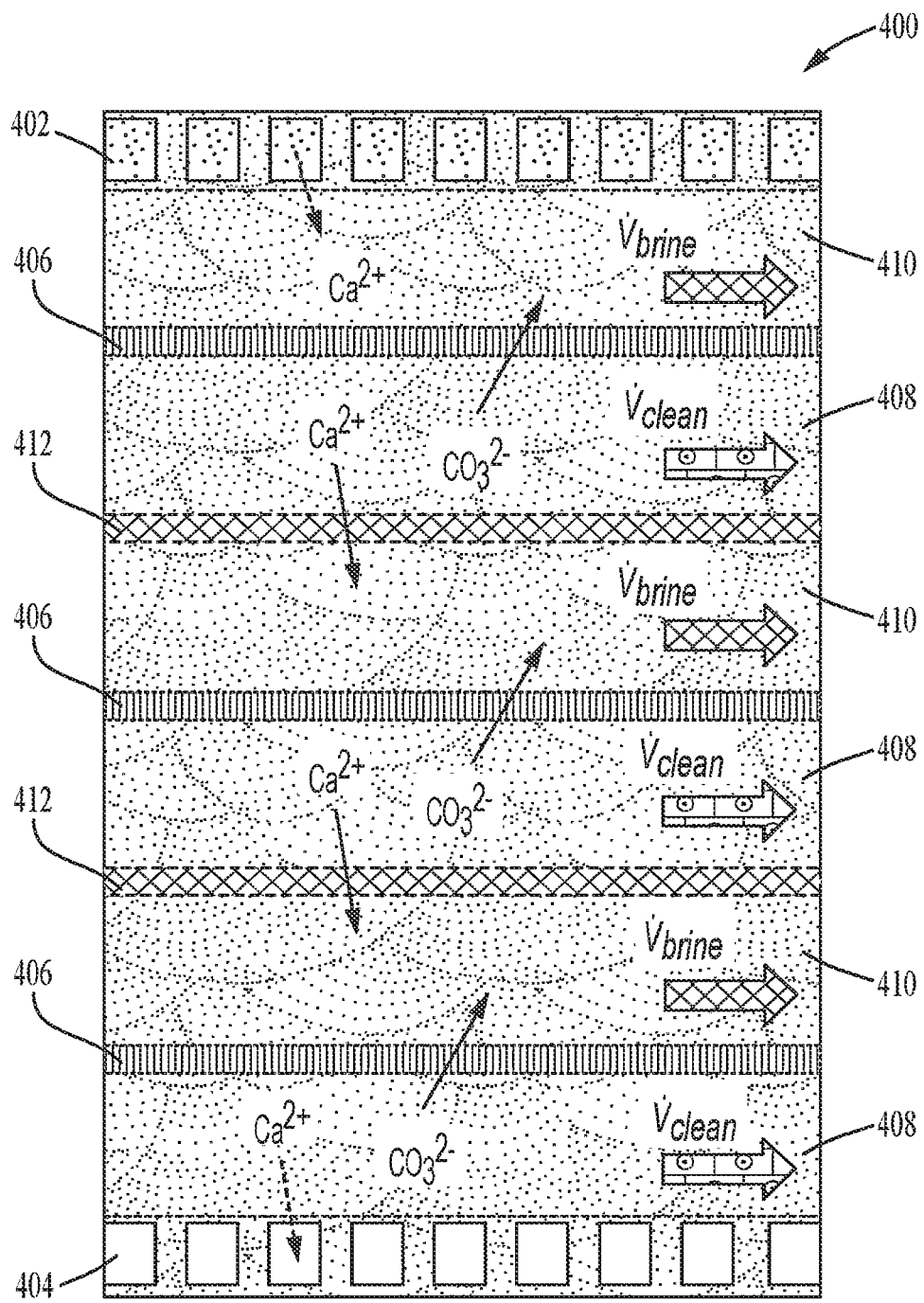
FIG. 2C is a schematic diagram of a non-limiting example of a battery/deionization cell according to one or more embodiments.

In accordance with at least another embodiment, as depicted in FIG. 2C for example, a battery cell 400 may include a plurality of water stream compartments 408, 410 separated by one or more anion exchange membranes (AEM) 406 and one or more cation exchange membranes (CEM) 412 in an electrodialysis configuration in which electrodes 402, 404 are located at opposing ends of the electrodialysis stack. In accordance with such an embodiment, when cations, e.g., $Ca^{2+}$, are intercalated into an electrode adjacent to a first of the water compartments, anions cross the AEM in order to move to an adjacent water compartment within the electrodialysis stack due to charge neutrality. For the same reason, an identical number of cations then need to be transferred into the next compartment within the electrodialysis stack. This cascade of ion transport through AEM and CEM, respectively continues until the last compartment is reached, where cations are released from the intercalation hosts to balance the charge. The number of AEM and CEM pairs can typically range from 1 to 10, but may include additional pairs depending on the particular application. The stacking of more ion exchange membranes (IEMs) can reduce energy consumption, but also leads to increased stack cost and increased stack resistance. The use of more IEMs increases the ohmic resistances in the stack due to the finite membrane resistance and need for additional flow channels. This results in a decrease in the highest applicable current density. Thus, there is a clear tradeoff between energy consumption and performance. In accordance with various embodiments, the number of IEM pairs within the electrodialysis stack may range from 1 to 2, from 1 to 4, from 1-8, or from 1 to 10. Accordingly, various embodiments may contain between 2 and 11 AEMs and between 1 and 10 CEMs. The particular stack configuration shown in FIG. 2C, for example, includes 2 IEM pairs, 3 AEMs, and 2 CEMs.

For the sake of simplicity, the intercalation host electrodes depicted in FIGS. 2A through 2C are each shown to be at either 100% state of charge (SOC)—i.e., salt cations fully intercalated—or 0% SOC—i.e., all cation vacancies in the IH lattice available. During cell operation the electrodes will of course change their SOC as cations are moved between the cell's various compartments.

Intercalative deionization (IDI) can of course be realized using the self-standing, three-layer structure comprising intercalation electrode/anion exchange membrane/intercalation electrode. Such a configuration is shown in FIG. 2A, for example. The IDI concept does not require current collector sheets or separators, but rather mono/bipolar plates (MPPs/BPPs) preferably made of graphite or titanium with flow fields to direct the water streams—thereby maintaining the required separation of clean and brine water. Configurations of this type are shown in FIGS. 3A and 3B, for example.

Figure 3A:
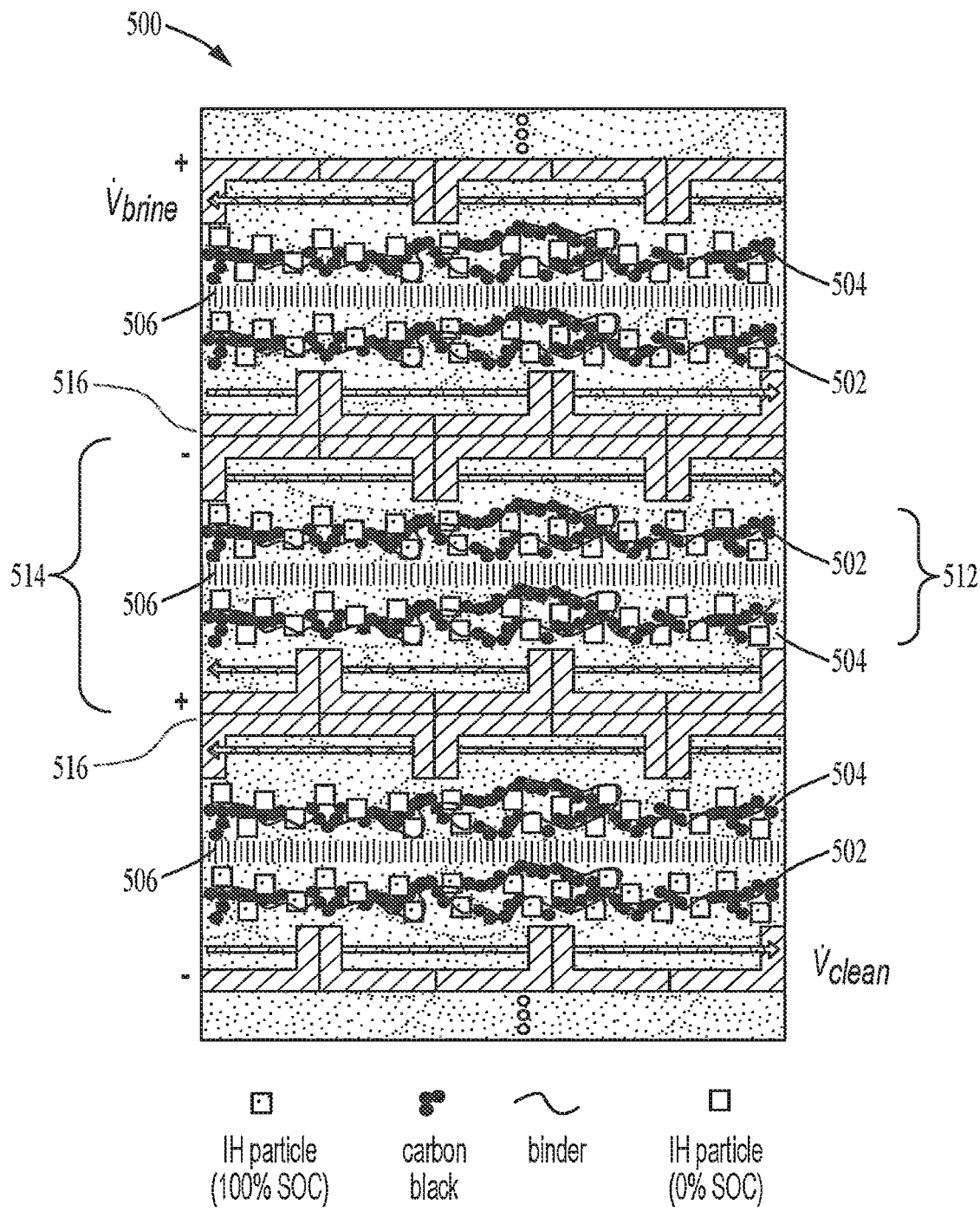
FIGS. 3A and 3B are schematic diagrams of various stack designs for intercalative water deionization in accordance with certain embodiments.
Figure 3B:
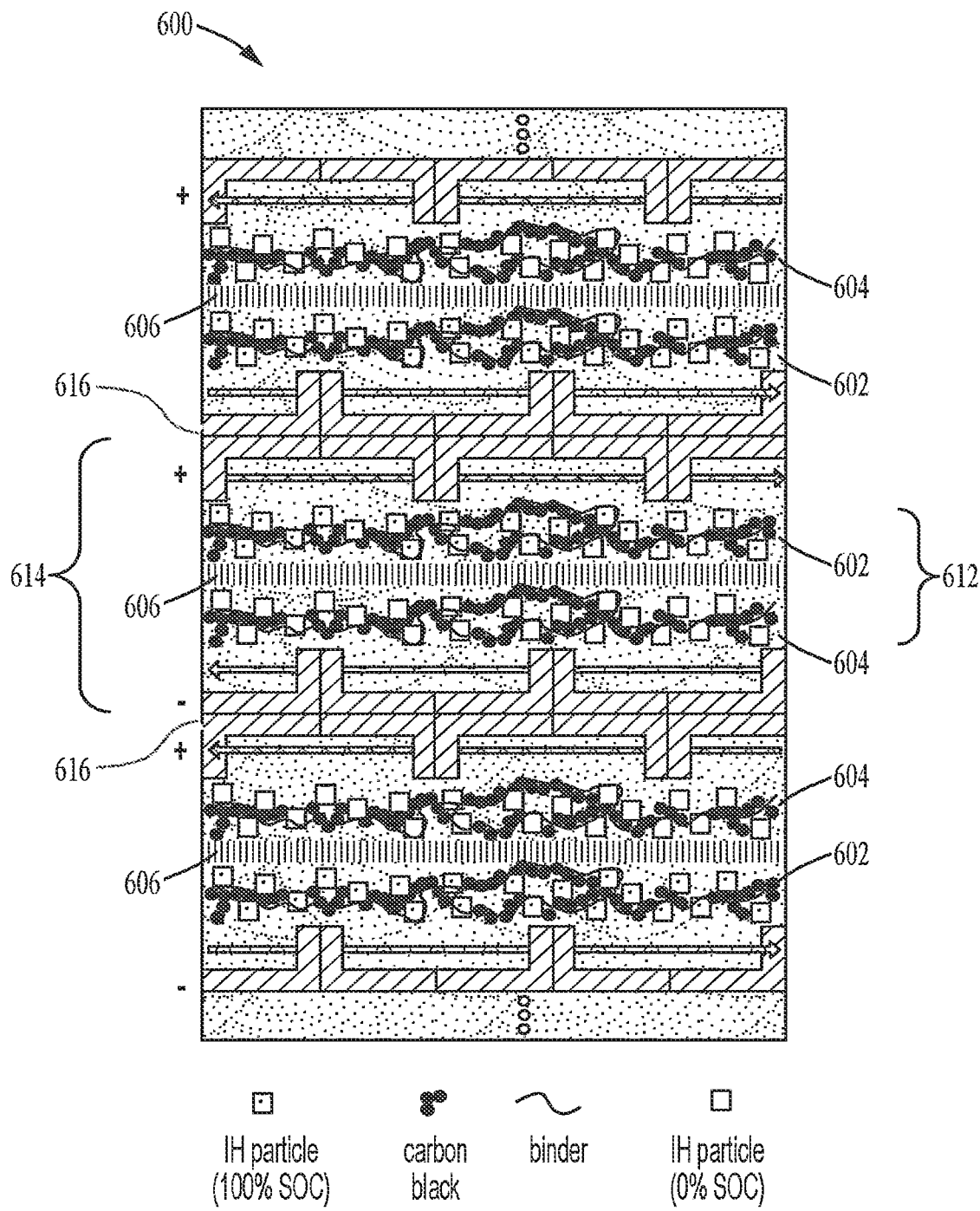

Depending on the particular requirements of a given application, the IDI stack can be designed in monopolar arrangement as depicted in FIG. 3A, for example. The monopolar IDI stack arrangement is characterized by high capacity due to the cells' series alignment giving rise to additive cell voltage. Alternatively, the IDI stack can be designed in bipolar arrangement as depicted in FIG. 3B, for example. Unlike monopolar arrangements, bipolar arrangements favor high current due to the parallel cell arrangement giving rise to additive cell current.

As noted above, FIGS. 3A and 3B respectively depict examples of monopolar and bipolar stack design each of which is characterized by multiple battery/deionization cells. The monopolar design shown in FIG. 3A includes intercalation host (IH) electrodes 502, 504 separated by an anion exchange membrane (AEM) 506. IH electrodes 502, 504 and AEM 506 together forming a membrane electrode assembly (MEA) 512 within cell 514 of electrochemical water cleaning device stack 500. Individual cells 514 are separated by monopolar plates (MPPs) 516 defining a flow field of clean and brine water streams in which flow direction is the same on each side of MPP 516—i.e., co-flow configuration. Alternatively, the bipolar design shown in FIG. 3B includes IH electrodes 602, 604 separated by an AEM 606. IH electrodes 602, 604 and AEM 606 together forming a MEA 612 within cell 614 of electrochemical water cleaning device stack 600. Individual cells 614 are separated a flow field of clean and brine water streams in which flow direction is opposite on each side of BPP 616—i.e., counter-flow configuration.

Intercalation electrodes include intercalation host (IH) material, carbon black, and binder. Depending on the polarity of the mono/bipolar plates (MPPs/BPPs) the IH electrodes may be at either high SOC or low SOC. Again, for the sake of simplicity, the electrodes depicted in FIGS. 3A and 3B are each shown to be at either 100% SOC or 0% SOC. During operation the SOC will change for each electrode as ions move within the stack.

In accordance with one or more embodiments, water-cleaning methods utilizing battery and flow field designs described herein provide for water recovery targets—i.e., ratio of clean water produced to feed water put through the stack—of between 70 and 100%. In accordance with other embodiments, water recovery of between 80 and 90% is achievable. In accordance with still other embodiments, water recovery of greater than 90% is possible.

Figure 4A:
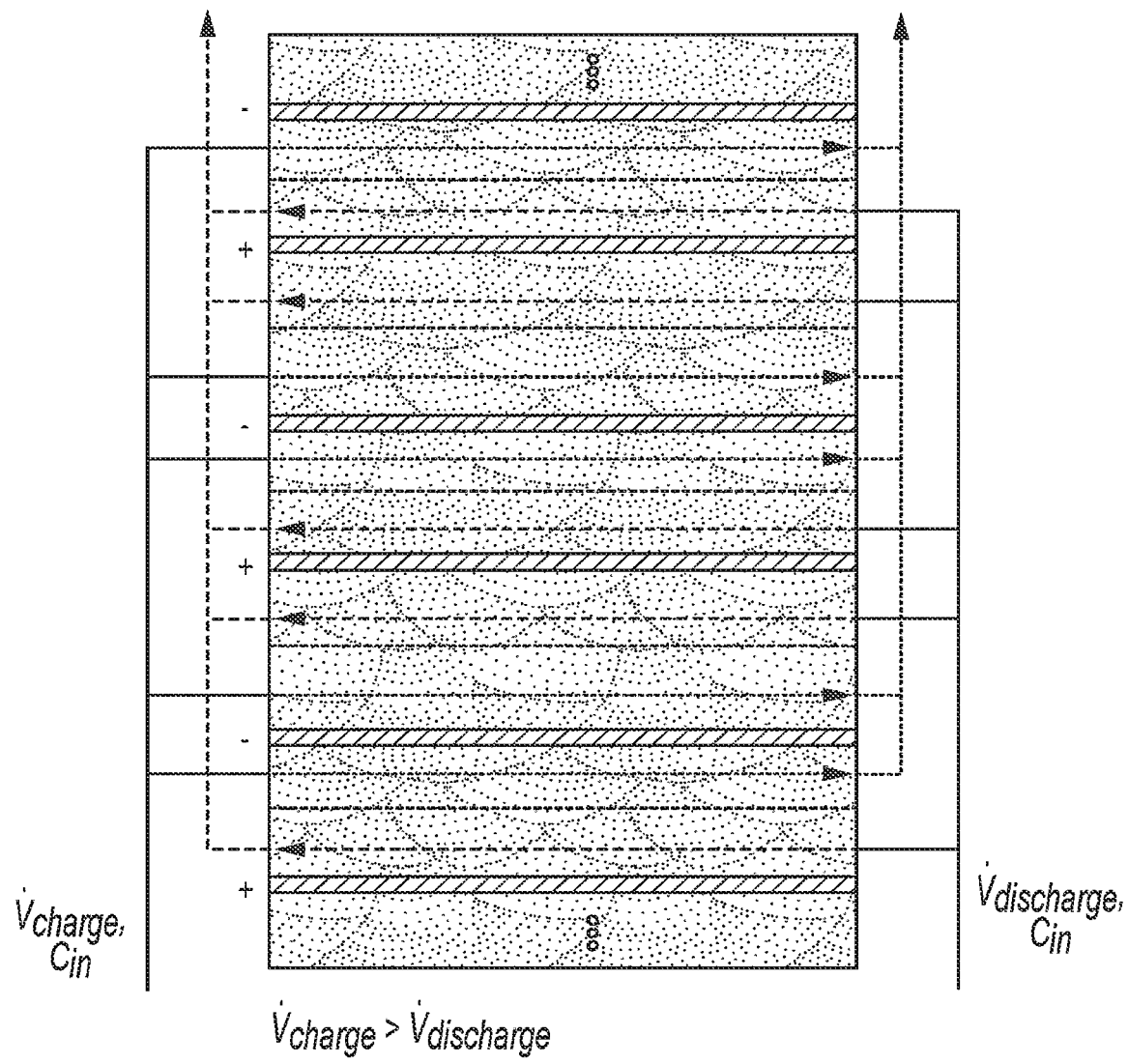
FIGS. 4A and 4B are schematic diagrams of feed, clean, and brine water stream directions and orientation in connection with various disclosed stack designs.

During charge, as depicted in FIG. 4A for example, feed water of salt concentration $c_{in}$ flows at a velocity $V_{charge}$ through a water distributor at a stack inlet (similar to a gas distribution manifold in a fuel cell stack) and is directed to the negatively polarized electrodes in the stack (indicated in FIG. 4A by "−" sign). Simultaneously, feed water is directed to the positively polarized electrodes (indicated in FIG. 4A by a "+" sign) at a lower flow rate $V_{brine}$—i.e., $V_{brine} < V_{charge}$ in order to achieve the water recovery target. The negatively polarized electrodes get charged by intercalating cations from the feed water stream, left-behind anions cross the AEM to maintain charge neutrality, and pair with cations expelled from the positively polarized electrode. The resultant clean water stream ($c_{out} \ll c_{in}$) can be collected for the intended use, while the brine ($c_{out} \gg c_{in}$) is be drained or collected for disposal. In the subsequent half-cycle, the polarity of the electrodes is reversed, e.g., by drawing a current, the flow rates are adjusted and what originally was the clean water stream now becomes the brine stream and vice versa. In other words, depending on the electrode polarity—controlled by whether current is applied to, or drawn from, the stack—either clean water is directed to the right-hand exhaust ($c_{out} < c_{in}$) and brine to the left-hand exhaust ($c_{brine} \gg c_{in}$) or vice versa.

Figure 4B:
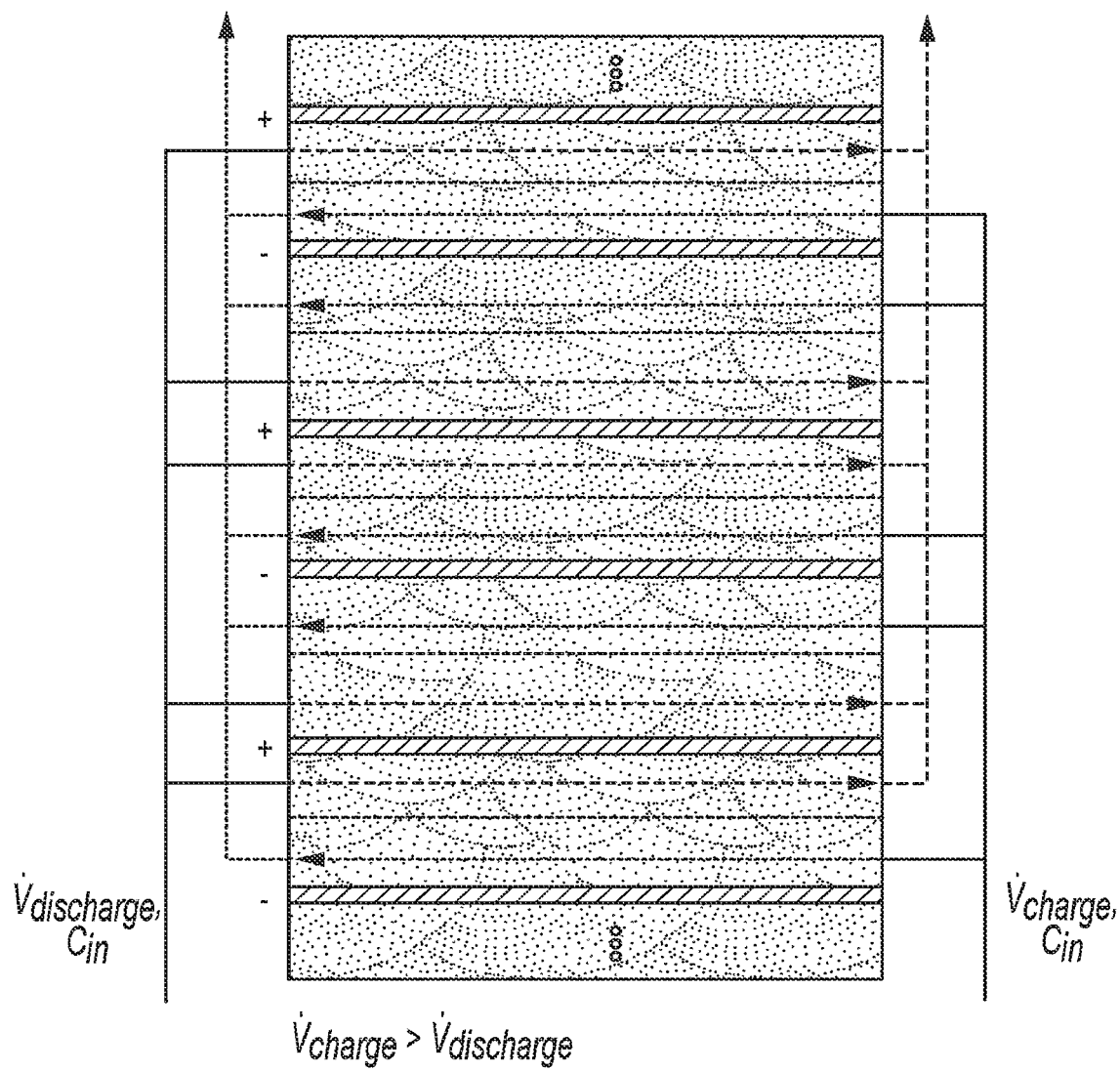

During discharge, as depicted in FIG. 4B for example, feed water of salt concentration $c_{in}$ flows at a velocity $V_{charge}$ through a water distributor at a stack inlet and is directed to the negatively polarized electrodes in the stack (indicated in FIG. 4B by "−" sign). In order to achieve the water recovery target, the flow rate of the brine water stream is lower than the flow rate of the clean water stream ($V_{discharge} = V_{brine} < V_{clean} = V_{charge}$).

In accordance with at least one embodiment, potential build-up may be cleared from the stack by including a high-flow rate cleaning cycle within the sequence of alternatingly applying and drawing current from the stack. Such a cycle may be characterized by flow rates of between approximately 1 ml/min and 100 l/min. According to certain embodiments, a high-flow rate cleaning cycle of between 1 l/min and 50 l/min or between 5 l/min and 25 l/min may be used. Such a cycle may be implemented approximately every $25^{th}$, $50^{th}$, or $100^{th}$ cycle. According to other embodiments, an intervening voltage-hold cycle may also be use to alleviate potential build-up within the stack. Again, such a cycle may be implemented approximately every $25^{th}$, $50^{th}$, or $100^{th}$ cycle and may last for between 1 and 3600 seconds. According to certain embodiments, an intervening voltage-hold cycle may last for between 10 and 180 seconds.

The intercalative deionization (IDI) concept allows for the generation of continuous clean water output in contrast to the established capacitive ionization concept (CDI), where a single water stream alternately transports either clean water or brine. Accordingly, IDI would in principle not require a storage tank, as clean water can be provided on demand without interruption.

Figure 5A:
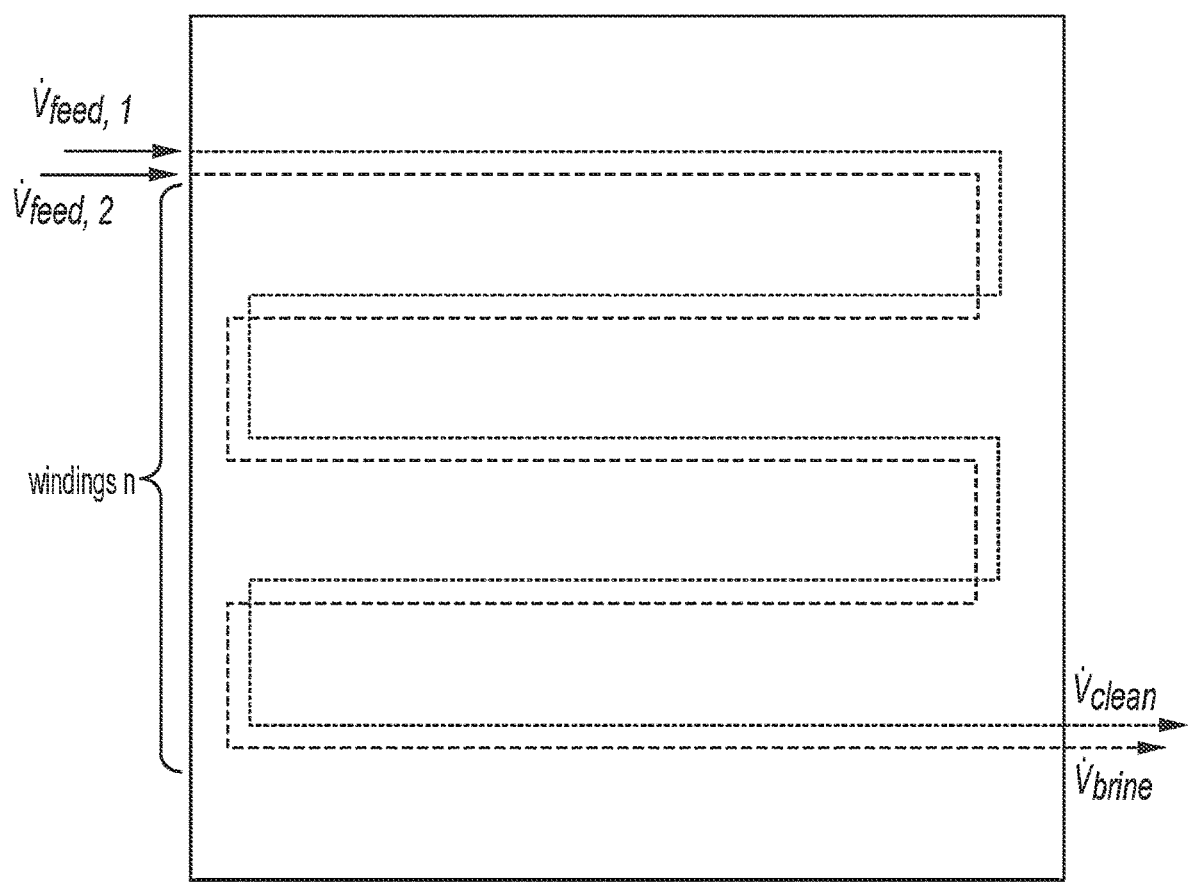
FIGS. 5A through 5C are schematic diagrams of various flow field designs according to one or more embodiments.
Figure 5B:
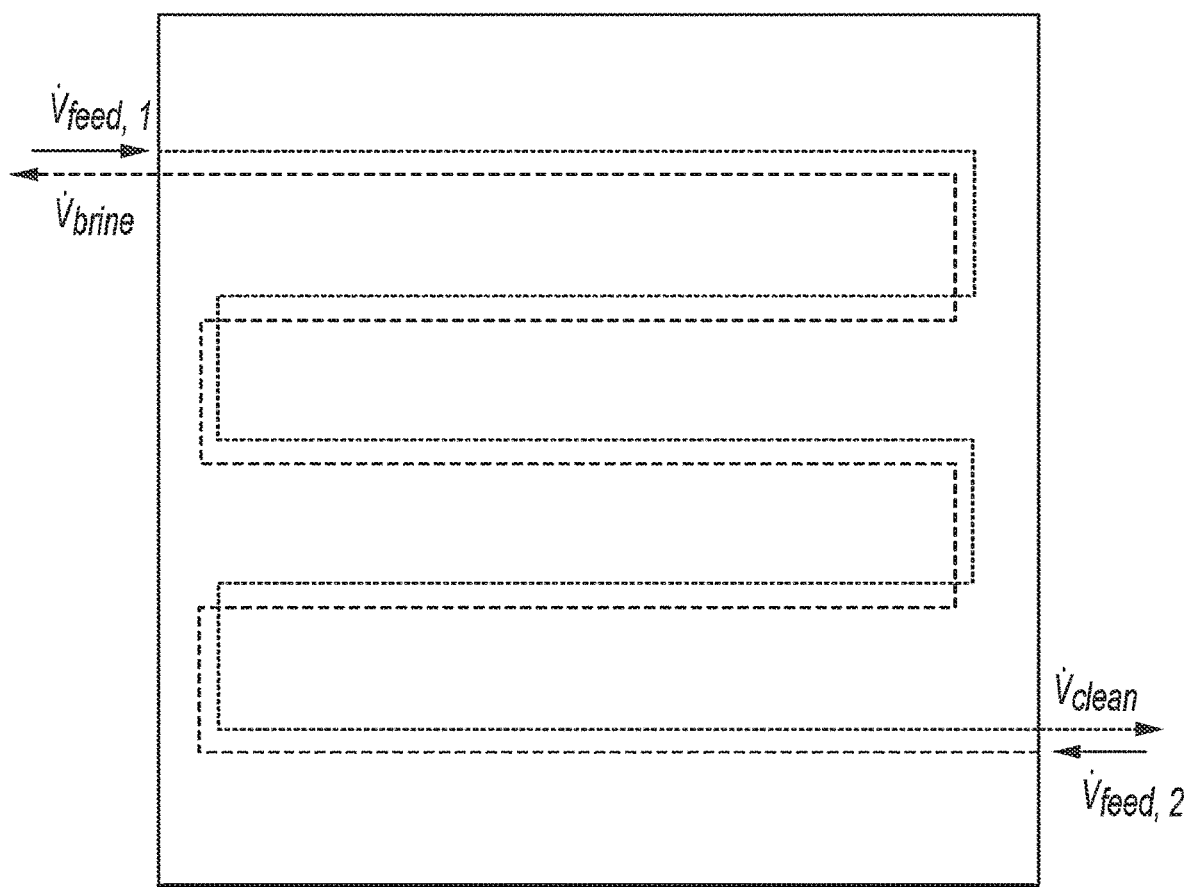

The desalination stack can also be realized with different flow field designs. As shown in FIG. 5A, for example, shows a serpentine flow field in co-flow operation. In accordance with this co-flow serpentine design, the water streams are oriented in the same general direction as they navigate through the stack architecture. According to other embodiments, such as the example shown in FIG. 5B, the desalination stack may include a serpentine flow field in counter-flow operation. In accordance with this counterflow-flow serpentine design, the water streams are oriented in generally opposing directions as they navigate through the stack architecture. While FIGS. 5A and 5B show serpentine flow field designs comprising four windings, the specific number of windings (i.e., 1800 switch backs), n, can be varied depending on the desired characteristics of the stack. According to various embodiments, the number of windings, n, can range from 1 to 20, from 2 to 10, or from 4 to 8.

Figure 5C:
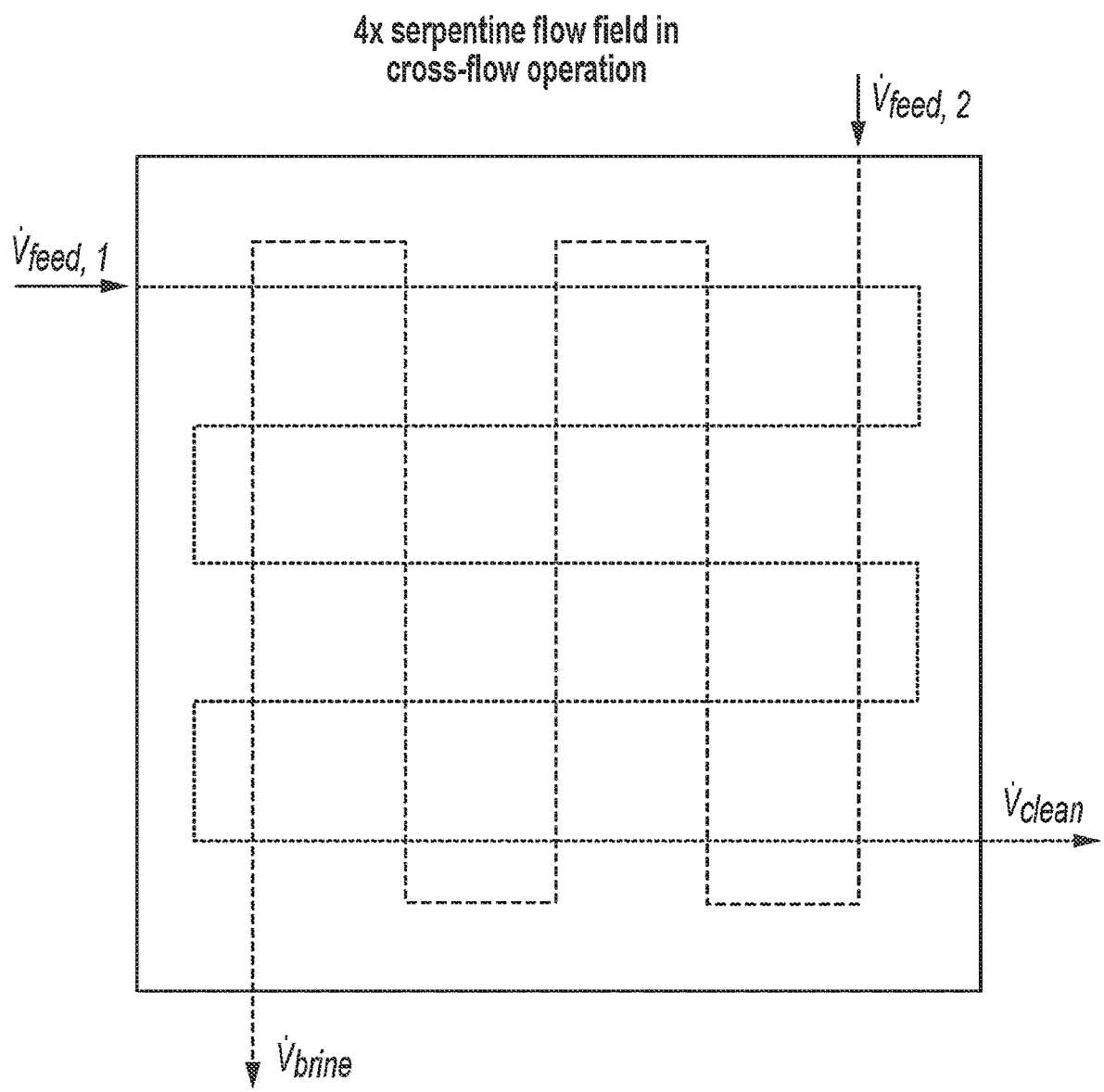

In addition to the co-flow and counter-flow designs, the desalination stack may implement a serpentine design characterized by cross-flows in which the clean and brine water flows are generally perpendicular to one another as they navigate through the stack architecture. An example of such a configuration is shown in FIG. 5C. Again, the number of windings, n, in each water flow can vary and may range from 1 to 20, from 2 to 10, or from 4 to 8 according to certain embodiments.

To mitigate the potential for localized corrosion in serpentine water flow designs incorporating abrupt directional changes—such as the examples depicted in FIGS. 5A through 5C—a number of designs may be implemented. According to at least one embodiment, a hydrophobic coating may be applied to the stack MPPs/BPPs. In connection with other embodiments, graphitic carbon or titanium may be utilized as a coating material to help combat the potential for localized corrosion within the stack due to the flow field design. Another corrosion-mitigating strategy may include the use of MPPs/BPPs entirely made of titanium or graphite, as such materials have been shown to be corrosion resistant in fuel cells.

Figure 6A:
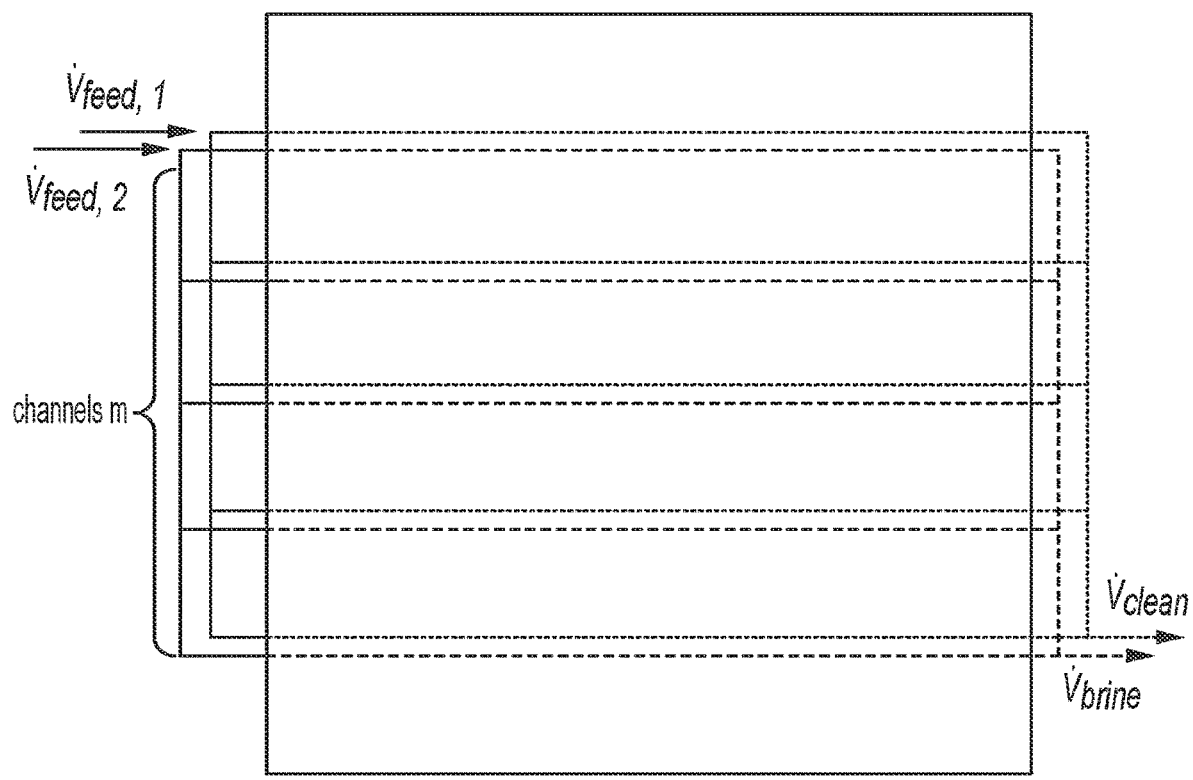
FIGS. 6A through 6C are schematic diagrams of various flow field designs according to one or more embodiments.
Figure 6B:
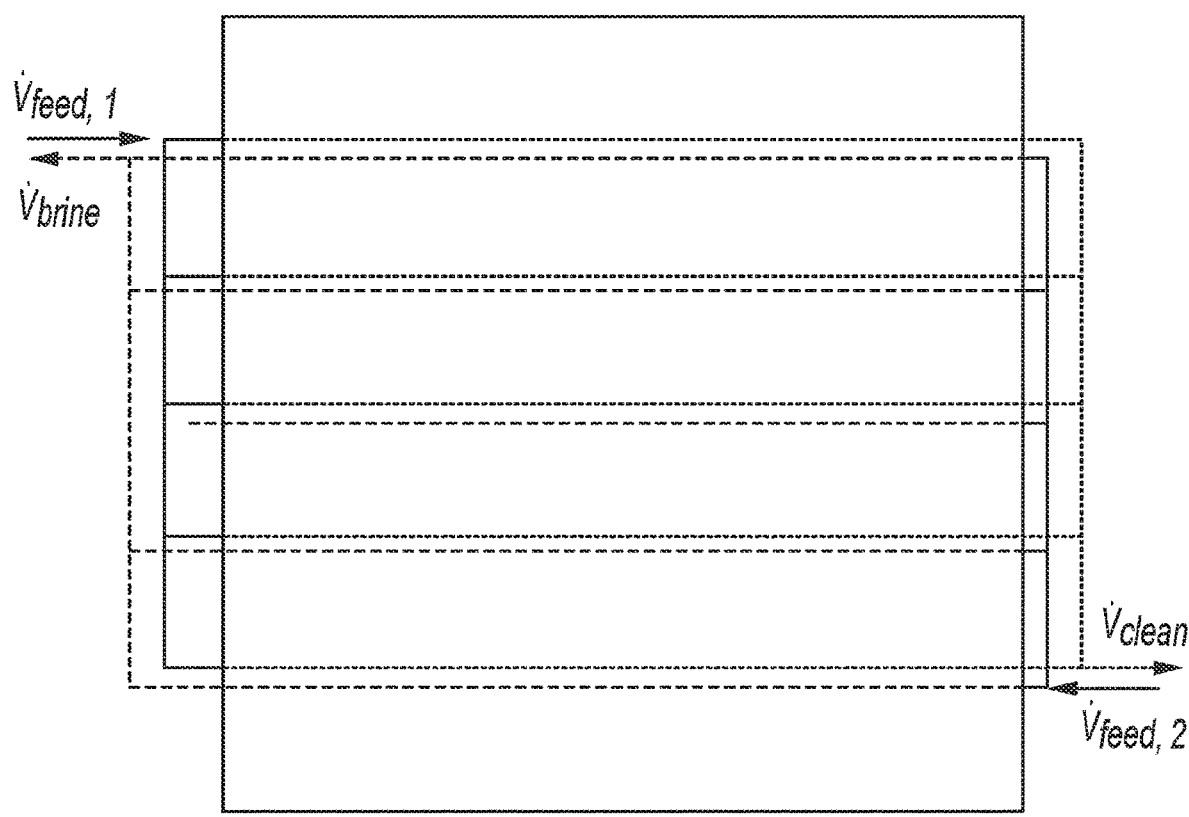
Figure 6C:
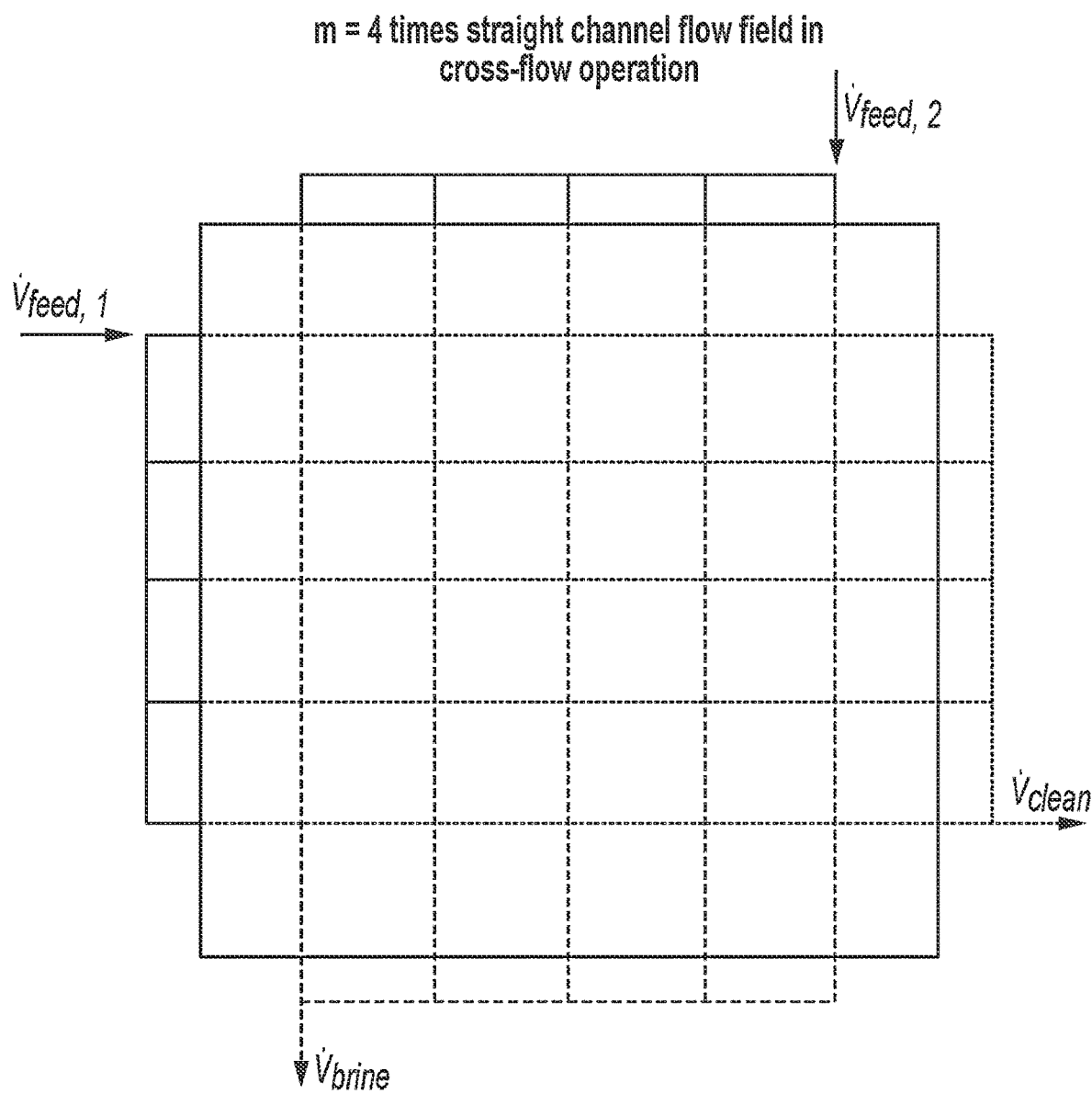

In addition to the serpentine co-flow, counter-flow, and cross-flow designs depicted in FIGS. 5A through 5C, the desalination stack can alternatively implement a straight-channel flow field design. Non-limiting examples of such alternative designs are shown in FIGS. 6A through 6C. In accordance with these straight-channel flow field designs, the specific number of parallel channels, m, can be varied depending on the desired characteristics of the stack. According to various embodiments, the number of channels, m, can range from 1 to 100, from 2 to 50, from 3 to 5, or from 5 to 20.

FIG. 6A depicts a straight-channel flow field in co-flow operation. In accordance with this co-flow design, the water streams are oriented in the same general direction as they navigate through the stack architecture. According to other embodiments, such as the example depicted in FIG. 6B, the desalination stack may include a straight-channel flow field in counter-flow operation. In accordance with this counter-flow-flow design, the water streams are oriented in generally opposing directions as they navigate through the stack architecture. Alternatively, as shown in the example set forth in FIG. 6C, the desalination stack may implement a straight-channel design characterized by cross-flows in which the clean and brine water flows are generally perpendicular to one another as they navigate through the stack architecture.

Figure 7A:
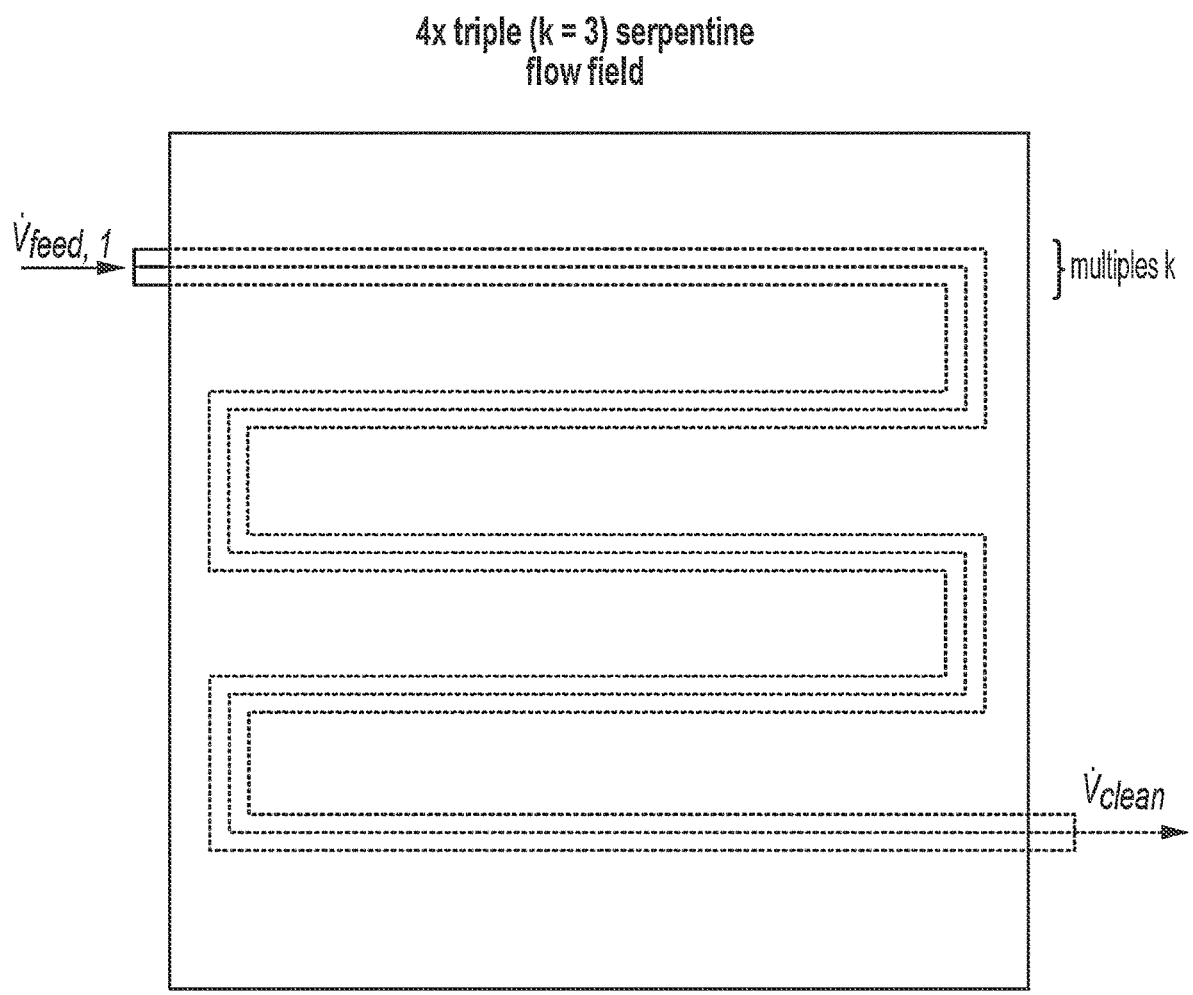
FIGS. 7A and 7B are schematic diagrams of various flow field designs according to one or more embodiments.
Figure 7B:
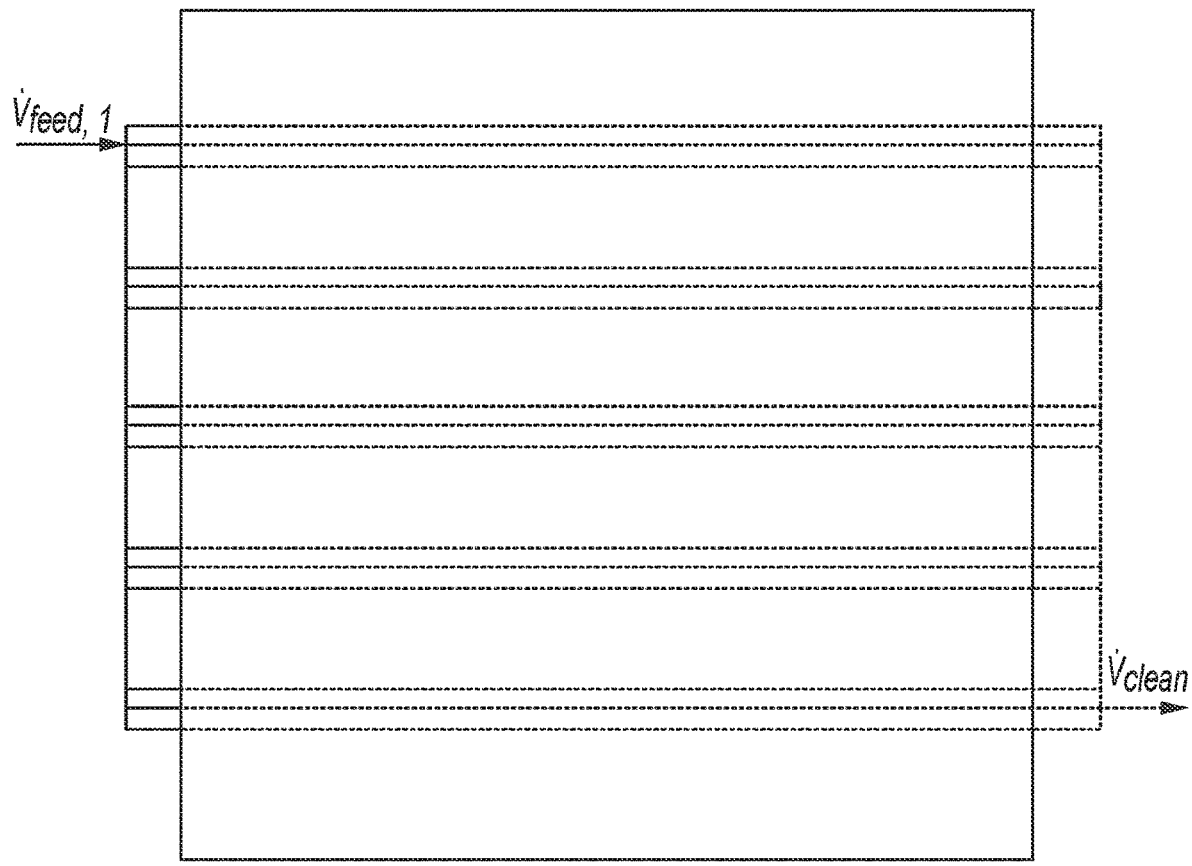

In accordance with one or more embodiments, the channels can split up into multiple parallel channels at the inlets. Examples of such designs are shown in FIGS. 7A and 7B. For example, FIG. 7A depicts feed and clean water streams in accordance with a triple serpentine flow field design while FIG. 7B depicts feed and clean water streams in accordance with a triple straight-channel flow field design. For the sake of simplicity, FIGS. 7A and 7B only depict the parallel channels in connection with the clean water flows through the desalination stack. According to certain embodiments, such a design can be applied to both the clean water and brine water or to just one of the flows. Additionally, the multiplication of parallel channels, k, can range from 1 to 20, from 2 to 10, or from 4 to 8 in accordance with various embodiments. Moreover, although FIGS. 7A and 7B depict only 4× serpentine and straight channel flow fields, respectively, the multiple parallel channel inlet design can be effectively applied to any of the example flow fields set forth in FIGS. 5A through 6C.

In order to manufacture a stack with the electrode configuration depicted in FIG. 2a (electrodes close to membrane), the electrodes can be tape casted directly onto both sides of the membrane. They can also be applied by spray coating the membrane or by brush painting or dip coating. Furthermore, the electrodes can be coated on a non-adhesive substrate, e.g., Kapton foil or PTFE foil, and subsequently transferred onto the membrane on a so called decal process that involved hot pressing the different layers to create low resistance interfaces for efficient ion transport.

In order to manufacture a stack with an electrode configuration such as that depicted in FIG. 2B, pore formers can be used that create a scaffold separating the electrode and ion exchange membrane and forms a sufficiently large channel for water flow. The pore formers can be mixed in the electrode ink and coated onto the membrane following known methods. Subsequently, the pore formers can be removed by dissolving them in water, EtOH, IPA, NMP, etc. The pore formers can also be removed by a mild heat treatment—e.g., between 60° C. and 100° C.

In order to manufacture a stack with the electrode configuration depicted in FIG. 2B, the stacking can be done with intermediate layers of separators that create sufficient distance between ion exchange membrane and electrodes. The separators can be high-porosity olefin sheets, nylon sheets, Kapton sheets, PTFE sheets, etc. Typical porosities of such sheets range from approximately 40% to 95%.

In order to manufacture a stack with the electrodialysis configuration depicted in FIG. 2C, either the pore former approach or the separator approach can be used to create sufficient gaps for water flow between the ion exchange membranes as well as the ion exchange membranes and the electrodes.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A deionization battery cell comprising:
   a first electrode compartment containing a first intercalation host electrode;
   a first water stream compartment in fluid communication with the first electrode compartment;
   a second electrode compartment containing a second intercalation host electrode;
   a second water stream compartment in fluid communication with the second electrode compartment; and
   an ion exchange membrane assembly including a plurality of anion exchange membranes separated from each other, and from one or more cation exchange membranes positioned between the anion exchange membranes, by a plurality of intervening water stream compartments, wherein the first and second water stream compartments are separated from one another by the ion exchange membrane assembly, the plurality of anion exchange membranes includes first and second anion exchange membranes, the first anion exchange membrane is adjacent the first intercalation host electrode, the second anion exchange membrane is adjacent the second intercalation host electrode, all adjacent membrane pairs alternate between anion and cation exchange membranes.

2. The deionization battery cell of claim 1, wherein the ion exchange membrane assembly includes between 2 and 11 anion exchange membranes and between 1 and 10 cation exchange membranes.

3. The deionization battery cell of claim 2, wherein the ion exchange membrane assembly includes between 2 and 11 intervening water stream compartments.

4. The deionization battery cell of claim 1, wherein the ion exchange membrane assembly includes between 4 and 8 anion exchange membranes and between 3 and 7 cation exchange membranes.

5. The deionization battery cell of claim 1, wherein the first and second intercalation host electrodes comprise an intercalation host material, a conductivity agent, and a polymeric binder.

6. The deionization battery cell of claim 5, wherein the conductivity agent includes carbon black, amorphous carbon, carbon fibers, quaternary ammonium salt, alkyl sulfonate, and/or halogen-free cationic compound.

7. The deionization battery cell of claim 1, wherein one or more of the plurality of anion exchange membranes include graphene and/or graphene oxide.

8. A deionization battery cell comprising:
a first electrode compartment containing a first intercalation host electrode;
a first water stream compartment in fluid communication with the first electrode compartment;
a first water inlet configured to feed a first water stream into the first water stream compartment in a first direction;
a second electrode compartment containing a second intercalation host electrode;
a second water stream compartment in fluid communication with the second electrode compartment;
a second water inlet configured to feed a second water stream into the second water stream compartment in a second direction;
an ion exchange membrane assembly including a plurality of anion exchange membranes separated from each other, and from one or more cation exchange membranes positioned between the anion exchange membranes, by a plurality of intervening water stream compartments, wherein the first and second water stream compartments are separated from one another by the ion exchange membrane assembly, the plurality of anion exchange membranes includes first and second anion exchange membranes, the first anion exchange membrane is adjacent the first intercalation host electrode, the second anion exchange membrane is adjacent the second intercalation host electrode, all adjacent membrane pairs alternate between anion and cation exchange membranes; and
a controller programmed to adjust an amount of an electric current supplied to change a flow of anions and/or cations present in the first and/or second water streams.

9. The deionization battery cell of claim 8, wherein the controller is configured to adjust a first and/or second volumetric flow rate in the first and/or second water inlets.

10. The deionization battery cell of claim 8, wherein the ion exchange membrane assembly includes more anion exchange membranes than cation exchange membranes.

11. The deionization battery cell of claim 8, wherein the ion exchange membrane assembly includes one more anion exchange membrane than cation exchange membrane.

12. The deionization battery cell of claim 8, wherein the first intercalation host electrode, the second intercalation host electrode, the anion exchange membrane, and the cation exchange membrane have the same length.

13. The deionization battery cell of claim 8, wherein the first water stream is a brine water stream, and the second water stream is a clean water stream.

14. The deionization battery cell of claim 8, wherein the first and second directions are the same.

15. A deionization battery cell comprising:
a first intercalation host electrode;
a first water stream compartment in fluid communication with the first intercalation host electrode;
a second intercalation host electrode;
a second water stream compartment in fluid communication with the second intercalation host electrode; and
an ion exchange membrane assembly including alternating anion exchange membranes and cation exchange membranes spaced apart from each other by intervening water stream compartments, the anion exchange membranes include first and second anion exchange membranes, the first anion exchange membrane is adjacent the first intercalation host electrode, and the second anion exchange membrane is adjacent the second intercalation host electrode, all adjacent membrane pairs alternate between anion and cation exchange membranes.

16. The deionization battery cell of claim 15, wherein the first and second water stream compartments are separated from one another by the ion exchange membrane assembly.

17. The deionization battery cell of claim 15, wherein the first intercalation host electrode, the second intercalation host electrode, the anion exchange membrane, and the cation exchange membrane have the same lengths.

18. The deionization battery cell of claim 15, wherein the ion exchange membrane assembly includes between 2 and 11 anion exchange membranes and between 1 and 10 cation exchange membranes.

19. The deionization battery cell of claim 18, wherein the ion exchange membrane assembly includes between 2 and 11 intervening water stream compartments.

20. The deionization battery cell of claim 15, wherein the first and second intercalation host electrodes comprise an intercalation host material, a conductivity agent, and a polymeric binder.

* * * * *